(12) United States Patent
Aitoh

(10) Patent No.: US 11,465,693 B2
(45) Date of Patent: Oct. 11, 2022

(54) STRUCTURAL MEMBER FOR VEHICLE

(71) Applicant: NIPPON STEEL CORPORATION, Tokyo (JP)

(72) Inventor: Takahiro Aitoh, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 121 days.

(21) Appl. No.: 17/256,521

(22) PCT Filed: Jul. 22, 2019

(86) PCT No.: PCT/JP2019/028714
§ 371 (c)(1),
(2) Date: Dec. 28, 2020

(87) PCT Pub. No.: WO2020/017662
PCT Pub. Date: Jan. 23, 2020

(65) Prior Publication Data
US 2021/0276630 A1    Sep. 9, 2021

(30) Foreign Application Priority Data

Jul. 20, 2018   (JP) .............................. JP2018-136977

(51) Int. Cl.
*B60J 7/00*   (2006.01)
*B62D 29/00*  (2006.01)
*B62D 21/15*  (2006.01)

(52) U.S. Cl.
CPC ............ *B62D 29/005* (2013.01); *B62D 21/15* (2013.01)

(58) Field of Classification Search
CPC .... H04W 12/06; A61P 35/00; B29C 66/8322; G06N 20/00; H04L 63/0823;
(Continued)

(56) References Cited

U.S. PATENT DOCUMENTS 3,217,894 A * 11/1965  Shewell ............... A47B 57/402
                                                         211/187
7,926,867 B2 * 4/2011  Kochert ............... B62D 29/002
                                                         296/203.02
(Continued)

FOREIGN PATENT DOCUMENTS

EP     1 617 098 B1    6/2011
EP     2 896 535 A1    7/2015
(Continued)

*Primary Examiner* — Kiran B Patel
(74) *Attorney, Agent, or Firm* — Birch, Stewart, Kolasch & Birch, LLP

(57) ABSTRACT

A structural member for vehicle 1 includes: a hollow member 10 made of metal, the hollow member 10 including cutout forming portions 12 arranged along a member longitudinal direction of the hollow member, the cutout forming portions 12 each having a cutout 13; and reinforcing parts 20 made of FRP, the reinforcing parts 20 bonded to the hollow member 10, the reinforcing parts 20 covering each of the cutouts 13 in each of the cutout forming portions 12, in which a first cutout forming portion 12a having the cutout 13 in the first region $R_1$ and a second cutout forming portion 12b having the cutout 13 in the second region $R_2$ are arranged alternately along the member longitudinal direction of the hollow member 10.

18 Claims, 14 Drawing Sheets

(58) Field of Classification Search
CPC ......... Y02T 10/12; Y02T 10/40; Y02E 60/10; Y02P 70/50; A61K 45/06
See application file for complete search history.

(56) References Cited

U.S. PATENT DOCUMENTS

| | | | | |
|---|---|---|---|---|
| 2010/0251941 | A1* | 10/2010 | Muirhead | G06F 21/554 |
| | | | | 108/51.11 |
| 2016/0251035 | A1* | 9/2016 | Kodama | B62D 21/152 |
| | | | | 296/187.12 |
| 2021/0101643 | A1* | 4/2021 | Boettcher | B62D 25/04 |

FOREIGN PATENT DOCUMENTS

| | | |
|---|---|---|
| JP | 5-85402 A | 4/1993 |
| JP | 5-105110 A | 4/1993 |
| JP | 4118263 B2 | 7/2008 |
| JP | 2012-218503 A | 11/2012 |
| JP | 2016-159679 A | 9/2016 |
| JP | 2017-159894 A | 9/2017 |
| WO | WO 2014/042211 A1 | 3/2014 |
| WO | WO 2014/112265 A1 | 7/2014 |

* cited by examiner (a)

(b)

(a)

(b)

(a)

(b)

STRUCTURAL MEMBER FOR VEHICLE

TECHNICAL FIELD

The present invention relates to a structural member for vehicle. This application is based upon and claims the benefit of priority of the prior Japanese Patent Application No. 2018-136977, filed on Jul. 20, 2018, the entire contents of which are incorporated herein by reference.

BACKGROUND ART

In recent years, there has been a demand to improve the fuel efficiency of automobiles from the viewpoint of global environmental protection. At the same time, there has been a demand to maintain or improve the collision safety of vehicles. In order to meet these demands, the development of high-strength and lightweight vehicle body structures has been in progress. Regarding also the frames that are a structural member for vehicle and form a framework of a vehicle body, increasing the strength and thinning of steel plates that form the frames have been in progress in order to achieve the reduction in weight of the vehicle body structure while maintaining conventional collision performance.

Further, in order to improve the collision safety of the vehicle, improving the energy absorption performance of a front part and a rear part of the vehicle, which are also called a "crushable zone," is required. For example, the crushable zone of the front part mainly consists of a part called a front side member and a part called a crash box that is arranged at the end of the front side member. Here, as a technique to improve the energy absorption performance of the front part of the vehicle, there has been disclosed a technique to apply FRP (fiber-reinforced plastics) to the crash box (a bumper beam extension) at the front of the vehicle in Patent Document 1. Further, as a technique to improve the energy absorption performance of the rear part of the vehicle, there has been disclosed a technique to apply FRP to the crash box (a crash rail) at the rear of the vehicle in Patent Document 2.

Further, as a main reinforcing part to be provided on an inner side of a hollow member, there has been described as an example carbon fiber in Patent Document 3. Further, Patent Document 4 has disclosed that a wall member forming an impact absorbing member to be used as a structural member of an automobile is configured to have a stacked structure of a sheet-shaped fiber reinforced member, Further, there has been disclosed a technique in which a plurality of beads are provided on a metal plate material of an impact absorbing member for vehicle in Patent Document 5.

PRIOR ART DOCUMENT

Patent Document

[Patent Document 1] International Publication No. WO 2014/042211

[Patent Document 2] International Publication No. WO 2014/112265

[Patent Document 3] Japanese Laid-open Patent Publication No. 2017-159894

[Patent Document 4] Japanese Laid-open Patent Publication No. 2012-218503

[Patent Document 5] Japanese Patent No. 4118263

DISCLOSURE OF THE INVENTION

Problems to be Solved by the Invention

The techniques disclosed in Patent Document 1 and Patent Document 2 aim at improving the energy absorption performance of the crash box itself by applying the FRP to the crash box. However, the crash box is a member aiming at absorbing the energy in collision with a low input load (what is called a light collision), such as a low-speed collision, for example, and in the case of collision with a large input load, such as a high-speed collision, for example, the crash box is crushed completely at the beginning of deformation, and then the front side member is deformed, and thereby, the energy absorption is achieved. The absorption amount of energy of the crash box is relatively low as compared to the front side member, and thus, when assuming a high load in the event of a high-speed collision, the crash box can only exhibit the limited energy absorption performance. In the meantime, there is not seen the example where the FRP (fiber-reinforced plastics) are applied to the front side member having a role in mainly absorbing the energy in the event of a high-speed collision. The reason for this is that the FRP have an extremely low ductility, and thus the FRP are broken under a large load at the beginning of deformation in the event of a high-speed collision, failing to obtain a target absorption amount of energy.

Further, even in the techniques disclosed in Patent Document 3 to 5, higher energy absorption performance was desired under a large load in the event of a high-speed collision.

The present invention has been made in consideration of the above-described problems, and has an object to maintain or improve the energy absorption performance of a structural member for vehicle in the event of a vehicle collision while reducing its weight.

Means for Solving the Problems

One aspect of the present invention that solves the above-described problems is a structural member for vehicle including: a hollow member made of metal, the hollow member including cutout forming portions arranged along a member longitudinal direction of the hollow member, the cutout forming portions each having a cutout; and reinforcing parts made of FRP, the reinforcing parts bonded to the hollow member, the reinforcing parts covering each of the cutouts in each of the cutout forming portions respectively, in which when on a coordinate axis with a barycenter of a cross section vertical to the member longitudinal direction of the hollow member set as an origin, a principal axis where a second moment of area is minimum is referred to as a first axis, an axis vertical to the first axis is referred to as a second axis, one region out of two regions of the hollow member, the two regions obtained by dividing the hollow member with the first axis or the second axis as a boundary, is referred to as a first region, and the other region is referred to as a second region, a first cutout forming portion having the cutout in the first region and a second cutout forming portion having the cutout in the second region are arranged alternately along the member longitudinal direction of the hollow member.

In the above-described structural member for vehicle, it is possible to increase the number of bent points of the hollow member to be bent when a high load is input from the member longitudinal direction. The bent point of the hollow member contributes to the energy absorption by plastic deformation caused when the load is input, while the portion other than the bent point is not plastically deformed very much, resulting in that its contribution to the energy absorption is low. Therefore, the number of bent points is increased, thereby making it possible to increase the region where plastic deformation occurs in response to the load input and improve the energy absorption performance.

Effect of the Invention

According to the present invention, it is possible to maintain or improve the energy absorption performance of a structural member for vehicle in the event of a vehicle collision while reducing its weight.

BRIEF DESCRIPTION OF THE DRAWINGS

FIG. 7(a) is a view corresponding to the cross section taken along a-a in FIG. 4, and FIG. 7(b) is a view corresponding to the cross section taken along b-b in FIG. 4.

FIG. 8(a) is a view corresponding to the cross section taken along a-a in FIG. 4, and FIG. 8(b) is a view corresponding to the cross section taken along b-b in FIG. 4.

FIG. 9(a) is a view corresponding to the cross section taken along a-a in FIG. 4, and FIG. 9(b) is a view corresponding to the cross section taken along b-b in FIG. 4.

MODE FOR CARRYING OUT THE INVENTION

Figure 1:
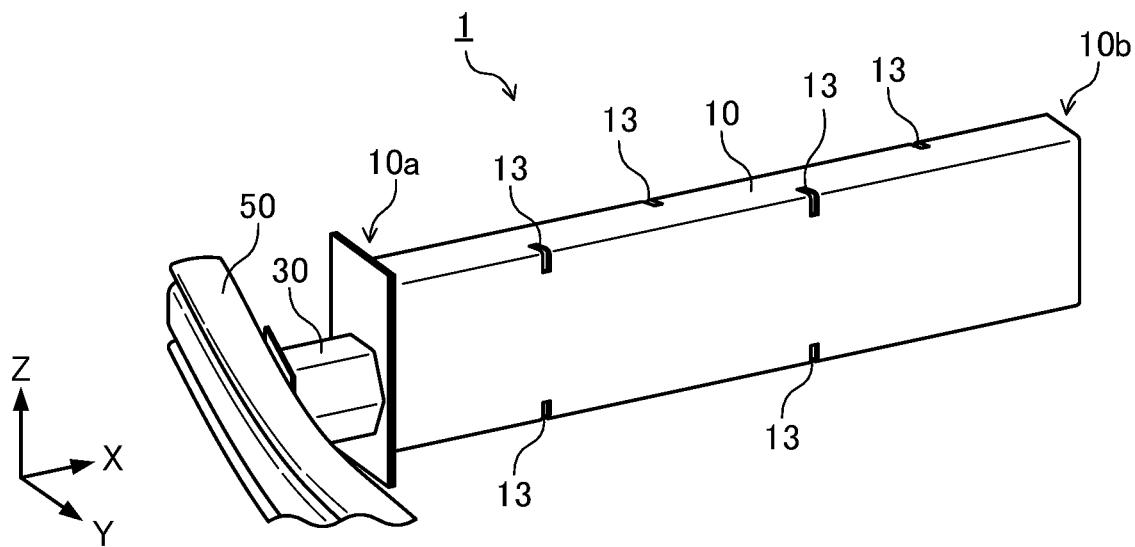
FIG. 1 is a perspective view illustrating a state where a vehicle frame according to one embodiment of the present invention and a different member are joined.

Hereinafter, one embodiment of the present invention will be explained with reference to the drawings. Incidentally, in this description and the drawing, the components having substantially the same functional configuration are denoted by the same reference numerals and symbols, thereby omitting the duplicate explanation.

<1. Application Object of a Structural Member for Vehicle>

Before explaining a configuration of a vehicle frame, which is one example of a structural member for vehicle, application objects of the structural member for vehicle will be explained. The vehicle body to be provided in a vehicle of a general automobile or the like can be divided into a front structure (FRONT), a rear structure (REAR), and a cabin structure (CABIN).

The front structure and the rear structure have a function to absorb and mitigate the impact on the vehicle (an impact absorbing function) by crushing themselves in the event of a vehicle collision. That is, in order to ensure the safety of cabin occupants in the event of a vehicle collision, the front structure and the rear structure are required to have a structure that absorbs the energy generated by the collision (collision energy) as much as possible. Thus, frames that form the front structure and the rear structure are required to absorb a large amount of collision energy even when they are bent or crushed at the time of collision. The frames to be used for the front structure and the rear structure are, for example, a front side member, a rear side member, and so on. The front side member includes a front side member rear that forms a rear end portion and a front side member front that forms a front side portion relative to the rear end portion. The rear side member includes a rear side member rear that forms a rear end portion and a rear side member front that forms a front side portion relative to the rear end portion.

By the way, in order to achieve both the maintenance of collision safety and the weight reduction of the vehicle, increasing the strength and thinning of a steel plate that forms a vehicle body structure are in progress. Replacement of frames that form the above-described front structure, rear structure, and cabin structure with frames formed of a thinned high-strength steel plate is also in progress. Concretely, the plate thickness of the frame formed of the high-strength steel plate is set thinner than that of the frame formed of a conventional steel plate so that at least either an absorption amount of collision energy or load bearing capacity becomes equal to that of the frame formed of the conventional steel plate. This makes it possible to reduce the weight of the frame while maintaining the collision performance of the high-strength frame on a par with the conventional frame.

<2. Configuration of the Vehicle Frame>

(Components of the Frame)

Figure 2:
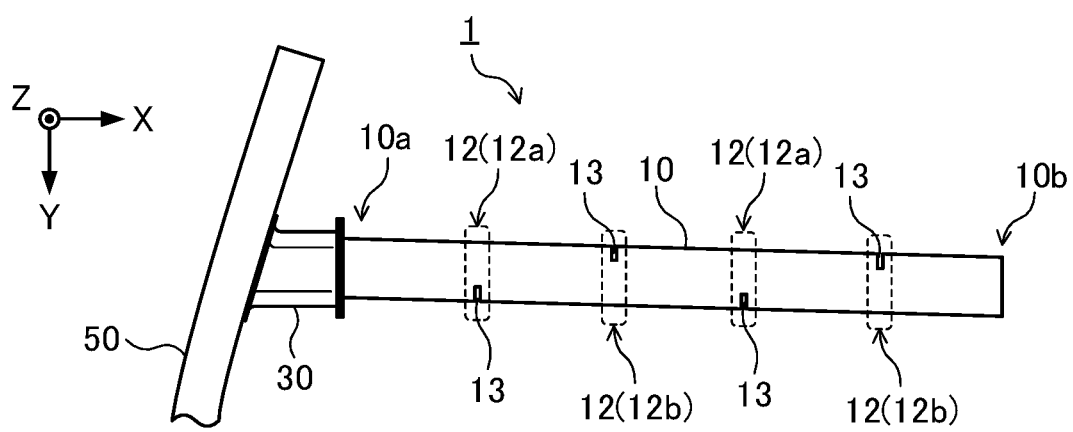
FIG. 2 is a plan view illustrating the state where the vehicle frame according to the same embodiment and the different member are joined.
Figure 3:
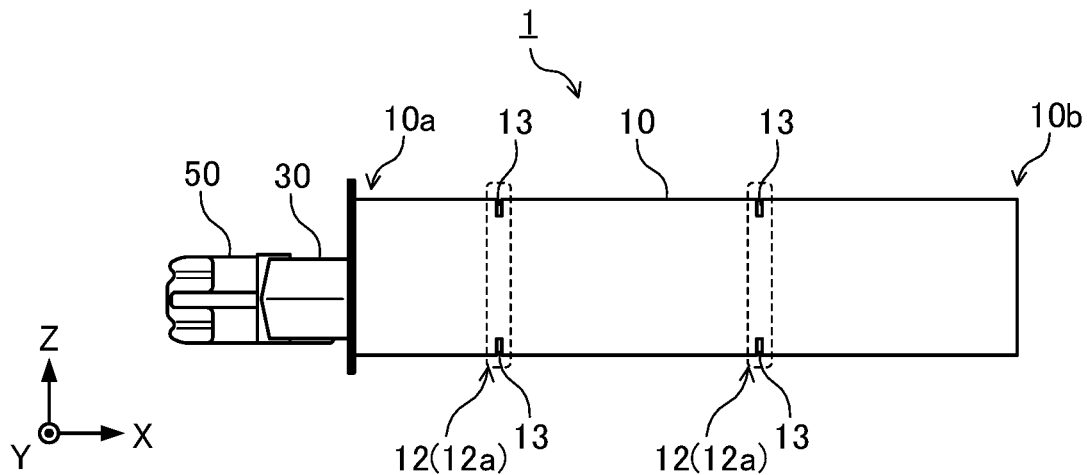
FIG. 3 is a side view illustrating the state where the vehicle frame according to the same embodiment and the different member are joined.

FIG. 1 is a perspective view illustrating a state where a vehicle frame 1 according to one embodiment of the present invention and a different member are joined. FIG. 2 is a plan view of the state, and FIG. 3 is a side view of the state. The vehicle frame 1 in the example illustrated in FIG. 1 to FIG. 3 is a front side member, and a front end of the front side member is joined to a bumper beam 50 via a crash box 30. Normally, two front side members are symmetrically arranged in front of a cabin part and only one side of them is illustrated in FIG. 1 to FIG. 3. Incidentally, the vehicle frame 1 is one example of the structural member for vehicle, and will be described as the frame 1 simply below. Although it is preferred for the frame 1 to be applied to members relating to the front structure and the rear structure, the vehicle frame 1 is also applicable to a member relating to the cabin structure. Further, the structural member for vehicle is applicable not only to automobiles but also to other vehicles and self-propelled machines. Examples of the other vehicles and the self-propelled machines include heavy vehicles such as motorcycles, buses and towing vehicles, trailers, railway vehicles, construction machines, mining machines, agricultural machines, general machines, vessels, and so on.

Figure 4:
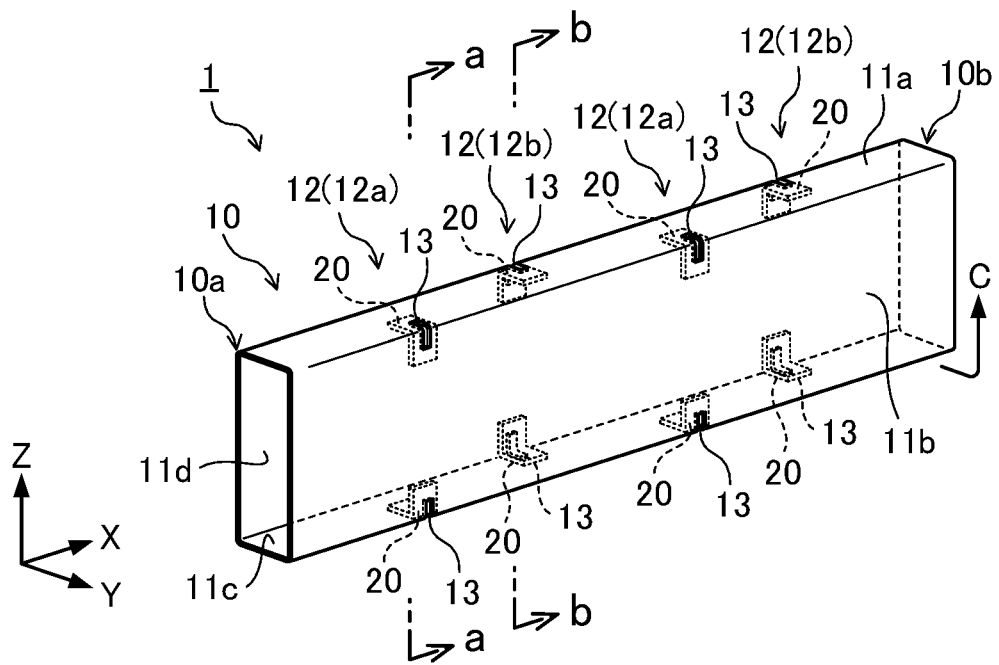
FIG. 4 is a perspective view illustrating a schematic configuration of the vehicle frame according to the same embodiment.
Figure 5:
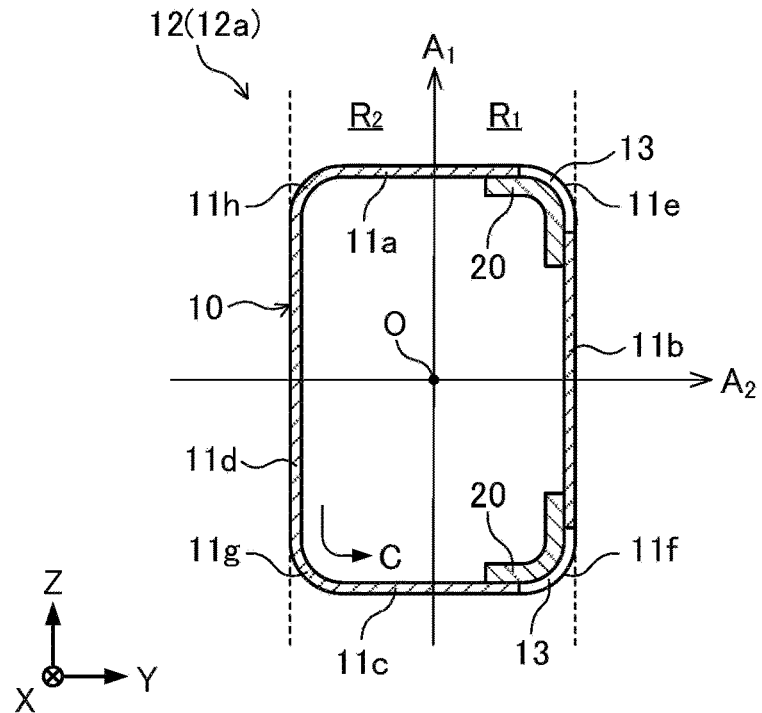
FIG. 5 is a cross-sectional view taken along a-a in FIG. 4.
Figure 6:
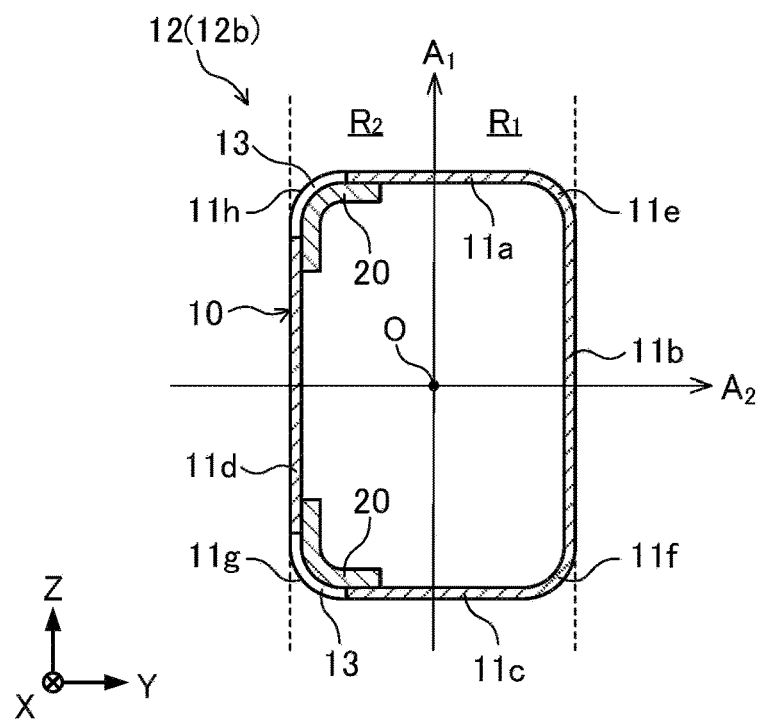
FIG. 6 is a cross-sectional view taken along b-b in FIG. 4.
Figure 7:
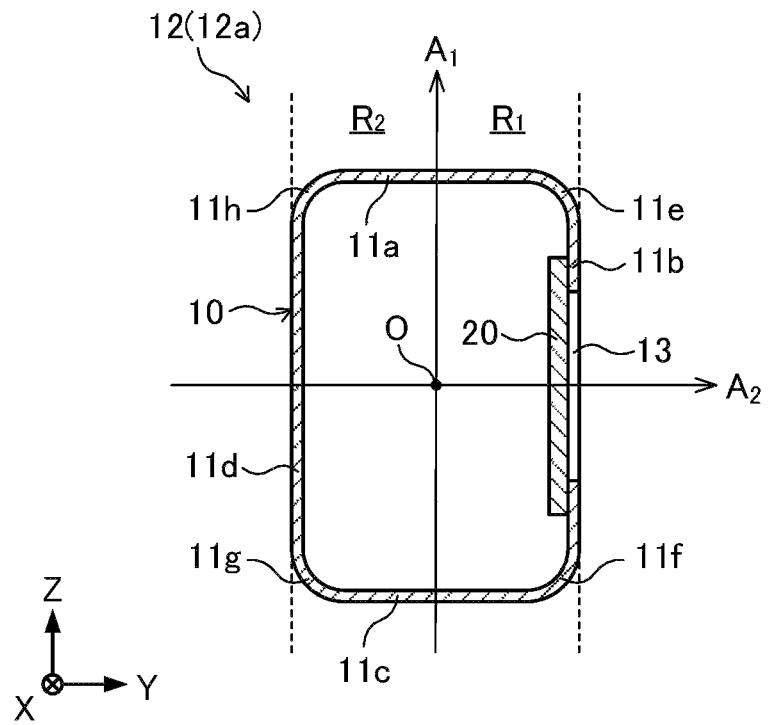
FIG. 7(a) and FIG. 7(b) are cross-sectional views each illustrating an arrangement example of a cutout and a reinforcing part.
Figure 7:
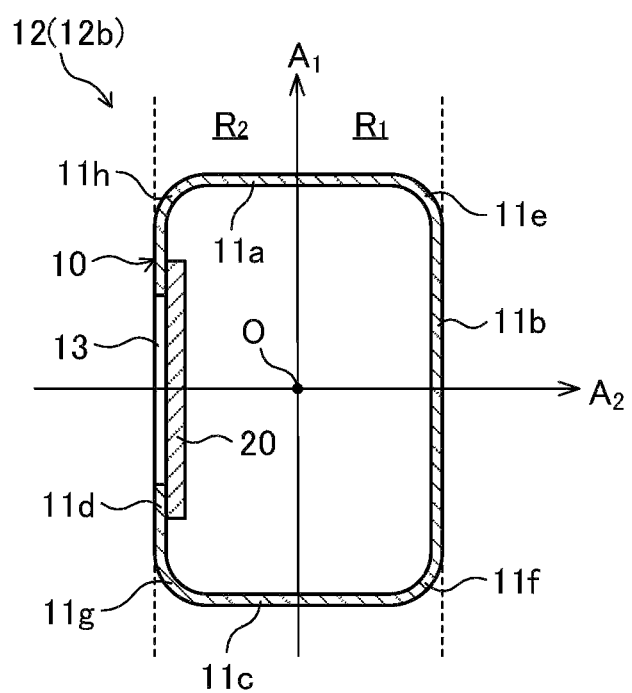
Figure 8:
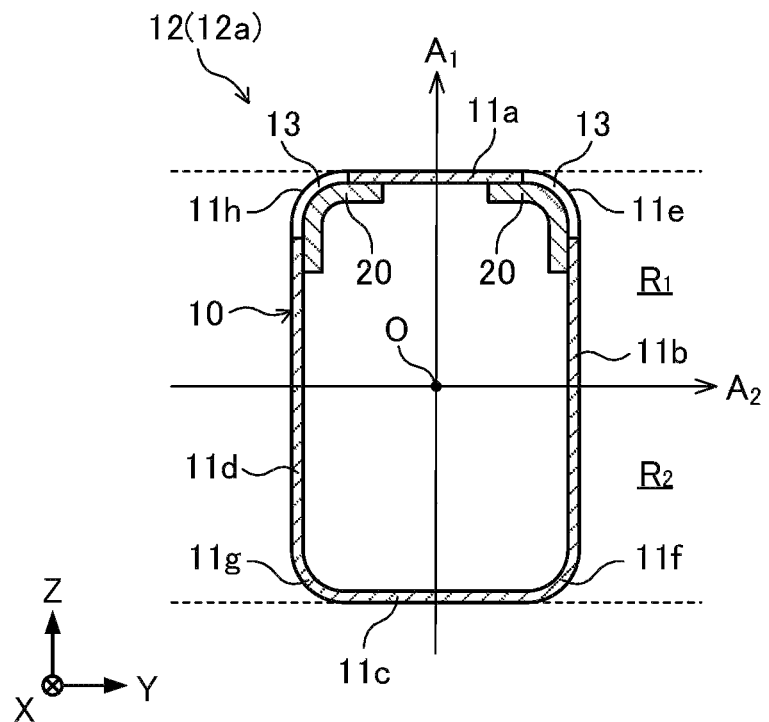
FIG. 8(a) and FIG. 8(b) are cross-sectional views each illustrating an arrangement example of the cutouts and the reinforcing parts.
Figure 8:
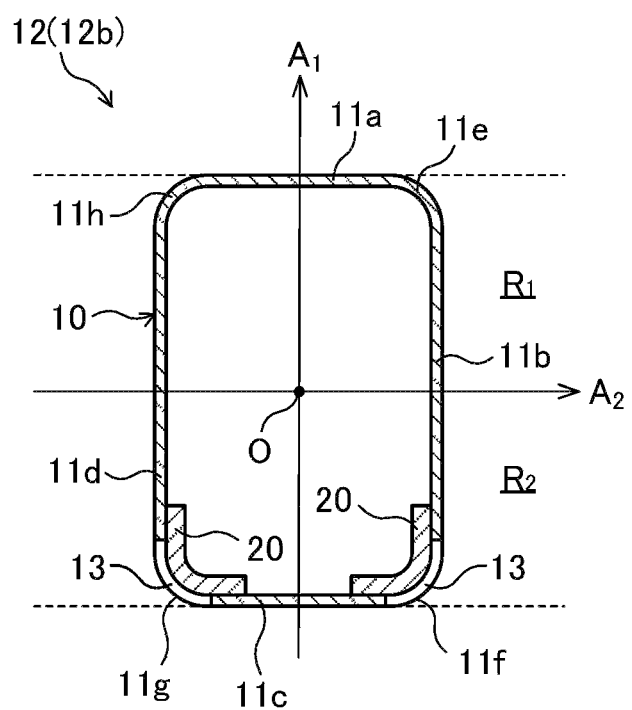
Figure 9:
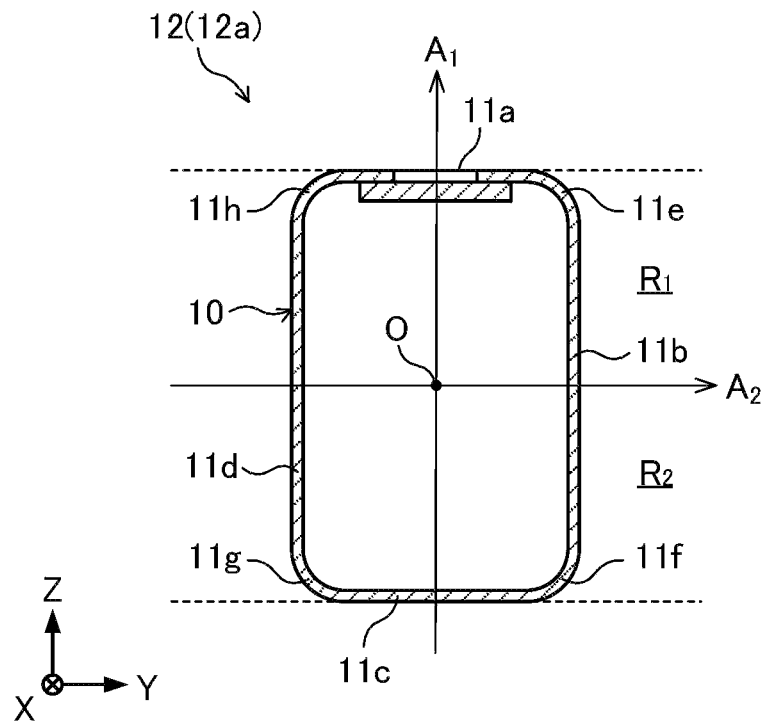
FIG. 9(a) and FIG. 9(b) are cross-sectional views each illustrating an arrangement example of the cutout and the reinforcing part.
Figure 9:
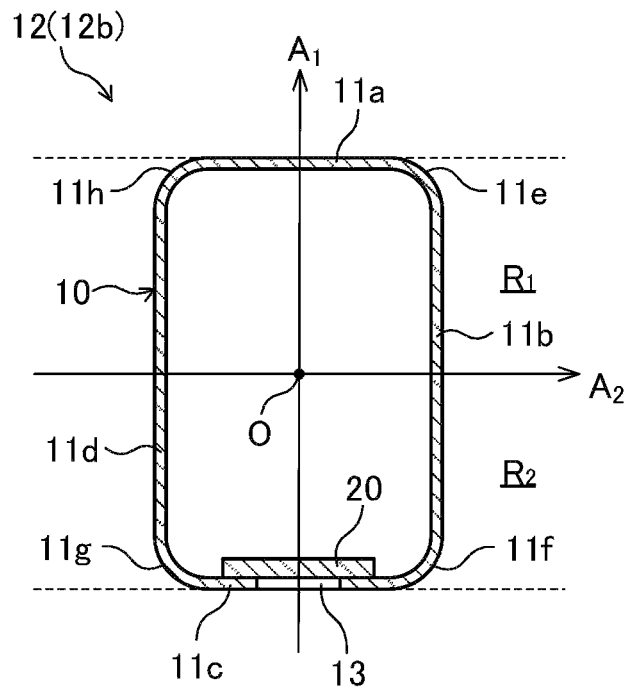

As illustrated in FIG. 4 to FIG. 6, the frame 1 in this embodiment includes a hollow member 10 made of metal and reinforcing parts 20 that are bonded to an inner surface of the hollow member 10. Incidentally, in this embodiment, the reinforcing parts 20 are bonded to the inner surface of the hollow member 10, but the reinforcing parts 20 may be bonded to an outer surface of the hollow member 10.

The hollow member 10 in this embodiment is one example of a long structural member and is a member with a rectangular cross-sectional shape vertical to a member longitudinal direction (the X direction in this embodiment). Although the hollow member 10 in this embodiment is a square tube-shaped member formed as one piece, the hollow member 10 may be composed of, for example, a flat plate-shaped closing plate and a member with a hat-shaped cross section that are joined. That is, the configuration of the hollow member 10 is not limited in particular as long as the cross section vertical to the member longitudinal direction X is configured to be a closed cross section. In this embodiment, for example, the shape of the hollow member 10 is rectangular, which is one example of a polygonal shape, but the hollow member 10 may be polygonal other than rectangular.

The hollow member 10 in this embodiment includes four plane portions 11a to 11d, and in the following explanation, out of these four plane portions 11a to 11d, in FIG. 5, the plane portion located on the upper side is referred to as a top wall portion 11a, the plane portion located on the right side is referred to as a side wall portion 11b, the plane portion located on the lower side is referred to as a bottom wall portion 11c, and the plane portion located on the left side is referred to as a side wall portion 11d. Further, a connection portion between the plane portions 11a and 11b, which is a boundary portion between the top wall portion 11a and the side wall portion 11b, is referred to as a ridge line portion 11e, a connection portion between the plane portions 11b and 11c, which is a boundary portion between the side wall portion 11b and the bottom wall portion 11c, is referred to as a ridge line portion 11f, a connection portion between the plane portions 11c and 11d, which is a boundary portion between the bottom wall portion 11c and the side wall portion 11d, is referred to as a ridge line portion 11g, and a connection portion between the plane portions 11d and 11a, which is a boundary portion between the side wall portion 11d and the top wall portion 11a, is referred to as a ridge line portion 11h.

The hollow member 10 is formed of a metal plate. There is no limit on the type of metal plate in particular, but the hollow member 10 is preferred to be formed of a metal plate such as a steel plate, for example. Further, from the viewpoint of collision performance, the plate thickness of the hollow member 10 is preferably 6.0 mm or less in the frame structure often used in heavy vehicles such as buses, and is preferably 3.2 mm or less in monocoque structure vehicles often used in normal size vehicles. Further, a tensile strength of the hollow member 10 is not limited in particular. However, the tensile strength of the hollow member 10 is preferred to be 590 MPa or more in order to compensate for the overall strength of the frame 1, which can be reduced by weight reduction. Further, the tensile strength of the hollow member 10 is further preferred to be 980 MPa or more.

In the hollow member 10, cutouts 13 are provided along the member longitudinal direction X. In this description, in the case where some of the cutouts 13 are provided in a cross section vertical to the member longitudinal direction X of the hollow member 10, as illustrated in FIG. 2 to FIG. 4, each of the portion where the cutouts 13 in the member longitudinal direction X of the hollow member 10 is located is referred to as a "cutout forming portion 12." Each of the cutout forming portions 12 of the hollow member 10 is arranged along the member longitudinal direction X. Incidentally, the "cutout" in this description is a hole passing through a wall of the hollow member 10. The cutout 13 in this embodiment has a shape whose longitudinal direction is a member circumferential direction C in the cross section vertical to the member longitudinal direction X of the hollow member 10. The cutout 13 is formed by machining or the like after the hollow member 10 is formed. The arrangement of the cutouts 13 will be described later.

As illustrated in FIG. 4, the reinforcing parts 20 are provided multiple, and each of the reinforcing parts 20 is bonded to the inner surface of the hollow member 10 in which the cutouts 13 are formed so as to cover each of the cutouts 13 in the cutout forming portions 12. In the hollow member 10, the length of the reinforcing part 20 in the member circumferential direction C and the length of the reinforcing part 20 in the member longitudinal direction X are sufficiently longer than the length of the cutout 13 in the member circumferential direction C and the length of the cutout 13 in the member longitudinal direction X. In the frame 1 in this embodiment, the reinforcing part 20 is provided at the position of the cutout 13 in the hollow member 10, and the single reinforcing part covers the single cutout 13. Therefore, when the cutout 13 is seen from the outside of the hollow member 10, the cutout 13 is in a state where the reinforcing part 20 bonded to the inner surface of the hollow member 10 is seen. The arrangement of the reinforcing parts 20 will be described later.

(Examples of the Reinforcing Part)

A FRP member used as the reinforcing part means a fiber-reinforced plastic member made of a matrix resin and a reinforcing fiber material contained in the matrix resin and combined therewith.

As the reinforcing fiber material, for example, carbon fibers or glass fibers can be used. Besides, as the reinforcing fiber material, boron fibers, silicon carbide fibers, aramid fibers, or the like can be used. In the FRP used for the FRP member, as a reinforcing fiber base serving as a base of the reinforcing fiber material, for example, a nonwoven fabric base using chopped fibers, a cloth material using continuous fibers, a unidirectional reinforcing fiber base (UD material), or the like can be used. These reinforcing fiber bases can be appropriately selected according to the necessity for orientation of the reinforcing fiber material.

A CFRP member is a FRP member using carbon fibers as the reinforcing fiber material. As the carbon fibers, for example, PAN-based carbon fibers or pitch-based carbon fibers can be used. Using the carbon fibers makes it possible to efficiently improve the strength or the like to a weight.

A GFRP member is a FRP member using glass fibers as the reinforcing fiber material. The glass fibers are inferior in mechanical properties to the carbon fibers, but can suppress electrolytic corrosion of the metal member.

As the matrix resin used for the FRP member, both a thermosetting resin and a thermoplastic resin can be used. As the thermosetting resin, there can be cited an epoxy resin, an unsaturated polyester resin, a vinylester resin, and so on. As the thermoplastic resin, there can be cited polyolefin (polyethylene, polypropylene, or the like) and an acid-modified product thereof, a polyamide resin such as nylon 6 or nylon 66, thermoplastic aromatic polyester such as polyethylene terephthalate or polybutyrene terephthalate, polycarbonate, polyethersulfone, polyphenyleneether and a modified product thereof, a styrene-based resin such as polyarylate, polyetherketone, polyetheretherketone, polyetherketoneketone, vinyl chloride, or polystyrene, a phenoxy resin, and so on. Incidentally, the matrix resin may be formed of multiple types of resin materials.

In consideration of the application to the metal member, from the viewpoints of workability and productivity, the thermoplastic resin is preferably used as the matrix resin. Further, using the phenoxy resin as the matrix resin makes it possible to increase the density of the reinforcing fiber material. Further, the phenoxy resin has a molecular structure very similar to that of an epoxy resin being the thermosetting resin, and thus has the same level of heat resistance as the epoxy resin. In addition, further adding a curing component also enables application to a high-temperature environment. In the case where the curing component is added, its addition amount only needs to be determined appropriately in consideration of impregnation of the reinforcing fiber material therewith, brittleness of the FRP member, a tack time, workability, or the like.

(Adhesive Resin Layer)

In the case where the reinforcing part is formed of the FRP member or the like, an adhesive resin layer may be provided between the FRP member and the metal member (the hollow member 10 in the above-described embodiment) and the FRP member and the metal member may be bonded by the adhesive resin layer.

The type of adhesive resin composition forming the adhesive resin layer is not limited in particular. For example, the adhesive resin composition may be either a thermosetting resin or a thermoplastic resin. The types of the thermosetting resin and the thermoplastic resin are not limited in particular. For example, as the thermoplastic resin, there can be used one or more selected from polyolefin and an acid-modified product thereof, polystyrene, polymethyl methacrylate, an AS resin, an ABS resin, thermoplastic aromatic polyester such as polyethylene terephthalate or polybutyrene terephthalate, polycarbonate, polyimide, polyamide, polyamide-imide, polyetherimide, polyethersulfone, polyphenyleneether and a modified product thereof, polyphenylene sulfide, polyoxymethylene, polyarylate, polyetherketone, polyetheretherketone, polyetherketoneketone, and so on. Further, as the thermosetting resin, for example, there can be used one or more selected from an epoxy resin, a vinylester resin, a phenolic resin, and a urethane resin.

The adhesive resin composition can be appropriately selected according to properties of the matrix resin forming the FRP member, properties of the reinforcing part, or properties of the metal member. For example, a resin having a functional group with polarity or a resin subjected to acid modification or the like is used as the adhesive resin layer, and thereby adhesiveness improves.

Thus, the FRP member is bonded to the metal member by using the above-described adhesive resin layer, thereby making it possible to improve adhesion between the FRP member and the metal member. Thus, it is possible to improve deformation followability of the FRP member when a load is input to the metal member. In this case, it becomes possible to more securely exhibit the effect of the FRP member corresponding to a deformed body of the metal member.

Incidentally, a form of the adhesive resin composition used for forming the adhesive resin layer can be, for example, powder, a liquid such as varnish, or a solid such as a film.

Further, by blending a crosslinking curable resin and a crosslinking agent in the adhesive resin composition, a crosslinkable adhesive resin composition may be formed. Thereby, heat resistance of the adhesive resin composition improves, which thus enables the application under a high-temperature environment. As the crosslinking curable resin, for example, a bifunctional or more epoxy resin or a crystalline epoxy resin can be used. Further, as the crosslinking agent, an amine, an acid anhydride, or the like can be used. Further, other additives such as various types of rubber, an inorganic filler, and a solvent may be blended in the adhesive resin composition within a range not impairing the adhesiveness and the physical properties.

Making a composite with the FRP member and the metal member is achieved by various methods. For example, the FRP or a FRP molding prepreg being its precursor that serves as the FRP member and the metal member are bonded by the above-described adhesive resin composition to solidify (or cure) the adhesive resin composition, thereby obtaining the composite of the FRP member and the metal member. In this case, for example, by performing thermocompression bonding, the composite of the FRP member and the metal member can be made.

The bonding of the above-described FRP or FRP molding prepreg to the metal member can be performed before, during or after molding of a part. For example, after molding a metal material, which is a material to be worked, into the metal member, the FRP or FRP molding prepreg may be bonded to the metal member. Further, after bonding the FRP or FRP molding prepreg to a material to be worked by thermocompression bonding, the FRP member-bonded material to be worked may be molded to obtain a composite metal member. If the matrix resin of the FRP member is the thermoplastic resin, molding such as bending can also be performed on a part to which the FRP member is bonded. Further, in the case where the matrix resin of the FRP member is the thermoplastic resin, combined batch molding in which a thermocompression bonding step and a molding step are integrated may be performed.

Incidentally, a bonding method of the FRP member and the metal member is not limited to the bonding by the above-described adhesive resin layer. For example, the FRP member and the metal member may be bonded mechanically. More specifically, the FRP member and the metal member may be bonded by forming fastening holes at corresponding positions of the FRP member and the metal member and fastening the FRP member and the metal member through the holes with fastening means such as a bolt and a rivet. Besides, the FRP member and the metal member may be bonded by a well-known bonding means. Further, the FRP member and the metal member may be bonded in a composite manner by a plurality of bonding means. For example, the bonding by the adhesive resin layer and the fastening by the fastening means may be used in a composite manner.

<Metal Member and Surface Treatment Thereof>

The metal member according to the present invention may be plated. Thereby, corrosion resistance improves. In the case where the metal member is a steel material in particular, plating is more suitable. The type of plating is not limited in particular, and well-known plating can be used. For example, as a plated steel plate (a steel material), there can be used a hot-dip galvanized steel plate, a hot-dip alloyed galvanized steel plate, a Zn—Al—Mg-based alloy plated steel plate, an aluminum-plated steel plate, an electrogalvanized steel plate, an electro Zn—Ni-based alloy plated steel plate, or the like.

Further, the metal member may be coated with a film called a conversion treatment on its surface. Thereby, the corrosion resistance further improves. As the conversion treatment, a generally well-known conversion treatment can be used. For example, as the conversion treatment, a zinc phosphate treatment, a chromate treatment, a chromate-free treatment, or the like can be used. Further, the above-described film may be a well-known resin film.

Further, the metal member may be subjected to generally well-known coating. Thereby, the corrosion resistance further improves. As the coating, well-known resins can be used. For example, as the coating, there can be used coating containing an epoxy resin, a urethane resin, an acrylic resin, a polyester resin, a fluorine-based resin, or the like as its main resin. Further, to the coating, generally well-known pigment may be added as necessary. Further, the coating may be clear coating with no pigment added thereto. Such coating may be applied to the metal member in advance before making a composite with the FRP member, or may be applied to the metal member after making a composite with the FRP member. Further, after applying the coating to the metal member in advance, a composite may be made with the FRP member, and thereafter, coating may be further applied. A coating material used for the coating may be a solvent-based coating material, a water-based coating material, a powder coating material, or the like. As a method of applying the coating, generally well-known methods can be applied. For example, as a method of applying the coating, there can be used electrodeposition coating, spray coating, electrostatic coating, dip coating, or the like. The electrodeposition coating is suitable for coating end surfaces and gaps of the metal member, and therefore the metal member is excellent in post-coating corrosion resistance. Further, a generally well-known conversion treatment such as a zinc phosphate treatment or a zirconia treatment is applied to the surface of the metal member before the coating, and thereby, coating film adhesion improves.

<3. Arrangement Examples of Cutouts and Reinforcing Parts>

(First Arrangement Example)

As illustrated in FIG. 4, in a first arrangement example, the cutout forming portions 12 of the hollow member 10 are provided at four places along the member longitudinal direction X. Here, FIG. 5 and FIG. 6 each are a cross section vertical to the member longitudinal direction X of the hollow member 10, an axis $A_1$ in FIG. 5 and FIG. 6 is the principal axis where a second moment of area is minimum on the coordinate axis with a barycenter O of the cross section as the origin. An axis $A_2$ is an axis vertical to the axis $A_1$ in the cross section, and is the principal axis where the second moment of area is maximum. In the following explanation, the above-described axis $A_1$ is referred to as a "first axis" and the above-described axis $A_2$ is referred to as a "second axis." Further, when the hollow member 10 is divided into two regions with the first axis $A_1$ as a boundary, one region is referred to as a "first region $R_1$" and the other region is referred to as a "second region $R_2$." In this embodiment, for convenience of explanation, in FIG. 5 and FIG. 6, the region to the right of the first axis $A_1$ is referred to as the first region $R_1$ and the region to the left of the first axis $A_1$ is referred to as the second region $R_2$, but there is no difference even if the region to the right of the first axis $A_1$ is referred to as the second region $R_2$ and the region to the left of the first axis $A_1$ is referred to as the first region $R_1$.

In this arrangement example, in the cutout forming portion 12, which is closest to a front end 10a of the hollow member 10, out of the four cutout forming portions 12, the cutouts 13 are each formed in the ridge line portions 11e and 11f in the first region $R_1$ as illustrated in FIG. 5. On the other hand, in the cutout forming portion 12 illustrated in FIG. 5, no cutouts 13 are provided in the second region $R_2$ of the hollow member 10. In this arrangement example, the cutout forming portion 12 having the cutouts 13 in the first region $R_1$ as above is referred to as a "first cutout forming portion 12a." In the first arrangement example illustrated in FIG. 4, out of the four cutout forming portions 12, the first cutout forming portion 12 and the third cutout forming portion 12 that start from the front end 10a of the hollow member 10 are the first cutout forming portion 12a. In the first cutout forming portion 12a, the reinforcing parts 20 are provided so as to cover the cutouts 13 in the ridge line portions 11e, 11f from the inner surface side of the hollow member 10. That is, in the first cutout forming portion 12a, the cutouts 13 and the reinforcing parts 20 are arranged only in the first region $R_1$.

FIG. 6 is a cross-sectional view of the cutout forming portion 12 at a position different from the above-described first cutout forming portion 12a. In this cutout forming portion 12, unlike the first cutout forming portion 12a, the cutouts 13 are each provided in the ridge line portions 11g, 11h in the second region $R_2$ of the hollow member 20 and no cutouts 13 are provided in the first region $R_1$. In the first arrangement example, the cutout forming portion 12 having the cutouts 13 in the second region $R_2$ as above is referred to as a "second cutout forming portion 12b." In the arrangement example illustrated in FIG. 4, out of the four cutout forming portions 12, the second cutout forming portion 12 and the fourth cutout forming portion 12 that start from the front end 10a of the hollow member 10 are the second cutout forming portion 12b. In the second cutout forming portion 12b, the reinforcing parts 20 are provided so as to cover the cutouts 13 in the ridge line portions 11g, 11h from the inner surface side of the hollow member 10. That is, in the second cutout forming portion 12b, the cutouts 13 and the reinforcing parts 20 are arranged only in the second region $R_2$.

In the first arrangement example, the first cutout forming portion 12a and the second cutout forming portion 12b are alternately arranged along the member longitudinal direction X of the hollow member 10. Incidentally, in this embodiment, although the cutout forming portion 12, which is closest to the front end 10a of the hollow member 10 that corresponds to an end portion of the hollow member 10 on a load input side, is the first cutout forming portion 12a, the cutout forming portion 12 closest to the front end 10a may be set to the second cutout forming portion 12b and the second cutout forming portion 12b and the first cutout forming portion 12a may be arranged alternately.

As will be described in later-described examples, in the case where the above-described cutouts 13 and reinforcing parts 20 are not provided, when a high load is input to the end portion of the hollow member, axial crush deformation occurs near the front end of the hollow member, and then bending deformation occurs at a single point between the front end and the rear end of the hollow member. Each one bent point, which is to be a point of bending, is made at the front and the rear of the bent point, and thus, three bent points are made as the entire hollow member. In the case where bending occurs in the hollow member, the portion other than the bent point is not plastically deformed very much and strain is small, so that the portion other than the bent point contributes little to the energy absorption.

In the meantime, in the frame 1 in this embodiment where the cutouts 13 and the reinforcing parts 20 are provided, bending can be induced in the cutout forming portions 12 of the hollow member 10, making it possible to increase the number of bent points. This makes it possible to increase the portion of the hollow member 10 that contributes to the energy absorption performance when a load is input, and it becomes possible to enhance the energy absorption performance of the frame 1 as a whole.

However, even when the cutouts 13 are formed in the hollow member 10, unless the reinforcing parts 20 covering the cutouts 13 are provided, a deformation mode when a load is input is not stabilized and bending does not occur in the cutout forming portions 12 in some cases. For example, in the case of the hollow member 10 in which such cutouts 13 as illustrated in FIG. 4 are formed, unless the reinforcing parts 20 are provided, bending first occurs in the second cutout forming portion 12b at the rear, rather than in the first cutout forming portion 12a closest to the front end 10a in some cases when a load is input to the front end 10a of the hollow member 10. In this case, the first cutout forming portion 12a does not contribute to the energy absorption performance. Further, in the case where bending first occurs in the second cutout forming portion 12b, bending is less likely to occur in the first cutout forming portion 12a, which is located forward of the second cutout forming portion 12b. Thus, from the viewpoint of energy absorption performance, bending of the hollow member 10 in each of the cutout forming portions 12 preferably occurs in sequence from the end portion on the load input side (the front end 10a in this embodiment) to the other end portion (a rear end 10b in this embodiment).

In the frame 1 in this embodiment, due to small ductility of the FRP used as the reinforcing part 20, the reinforcing part 20 is broken by the hollow member 10 being deformed when a load is input, but before the breakage, the reinforcing part 20 is in a state of being bonded to the hollow member 10 at the position of the cutout 13, and therefore, the hollow member 10 functions like a member without the cutout 13 formed therein. In the meantime, when a high load is input to the front end 10a of the hollow member 10, in the first cutout forming portion 12a, which is closest to the front end 10a of the hollow member 10, deformation caused by the load input occurs before in the second cutout forming portion 12b that is located further rearward. Therefore, the reinforcing part 20 arranged in the first cutout forming portion 12a, which is closest to the front end 10a, is broken earlier than the reinforcing parts 20 arranged in the other cutout forming portions 12. As a result, in the first cutout forming portion 12a close to the front end 10a, a reinforcing effect by the reinforcing part 20 is lost, while a reinforcing effect by the reinforcing parts 20 in the other cutout forming portions 12 is still maintained. Consequently, the first cutout forming portion 12a closest to the front end 10a becomes a portion with the weakest strength of the hollow member 10 as a whole, and bending occurs first in the first cutout forming portion 12a.

Thereafter, as the deformation of the hollow member 10 progresses further, deformation of the second cutout forming portion 12b, which is located at the rear of the first cutout forming portion 12a where the bending occurred, begins. With this, the reinforcing part 20 arranged in the second cutout forming portion 12b is also deformed. This causes the reinforcing part 20 located in the second cutout forming portion 12b to be broken, and bending occurs in the second cutout forming portion 12b following the first cutout forming portion 12a where the bending has already occurred. A deformation mode of the hollow member 10 with such bending occurs in sequence also in the subsequent first cutout forming portion 12a and second cutout forming portion 12b, and thus, each of the cutout forming portions 12 arranged in the hollow member 10 is bent in sequence along the member longitudinal direction X.

As described above, not only are the cutouts 13 provided in the hollow member 10, but also the reinforcing parts 20 covering the cutouts 13 are provided, thereby making it possible to stably induce bending in each of the cutout forming portions 12.

In order to more stably induce bending in each of the cutout forming portions 12, as in the first arrangement example, the first cutout forming portion 12a and the second cutout forming portion 12b are preferably arranged alternately along the member longitudinal direction X of the hollow member 10.

In the first arrangement example, for example, when a high load is input to the front end 10a of the hollow member 10, the first cutout forming portion 12a closest to the front end 10a of the hollow member 10 (the first cutout forming portion 12a) enters a deformation mode where the first region $R_1$ becomes compressed and the second region $R_2$ becomes tensile because the cutouts 13 are arranged only in the first region $R_1$. In the meantime, the second cutout forming portion 12 starting from the front end 10a of the hollow member 10 (the second cutout forming portion 12b) enters a deformation mode where the second region $R_2$ becomes compressed and the first region $R_1$ becomes tensile because the cutouts 13 are arranged only in the second region $R_2$. Similarly, the third cutout forming portion 12 starting from the front end 10a of the hollow member 10 (the first cutout forming portion 12a) enters a deformation mode where the first region $R_1$ becomes compressed and the second region $R_2$ becomes tensile. Further, the fourth cutout forming portion 12 starting from the front end 10a of the hollow member 10 (the second cutout forming portion 12b) enters a deformation mode where the second region $R_2$ becomes compressed and the first region $R_1$ becomes tensile.

This causes the respective cutout forming portions 12 arranged in the hollow member 10 to be bent in zigzag (zigzag left and right) along the member longitudinal direction X. As a result, it is possible to stably enhance the energy absorption performance of the frame 1 as a whole.

Further, the arrangements of the cutouts 13 and the reinforcing parts 20 in the first arrangement example are not limited to the example illustrated in FIG. 4 to FIG. 6, and the cutouts 13 and the reinforcing parts 20 may be arranged as illustrated in FIG. 7(a) and FIG. 7(b) to FIG. 9(a) and FIG. (b), for example.

In an arrangement example illustrated in FIG. 7(a), out of the four cutout forming portions 12 provided along the member longitudinal direction X of the hollow member 10, the first cutout forming portion 12 and the third cutout forming portion 12 that start from the front end 10a of the hollow member 10 are the first cutout forming portion 12a. Then, in the first cutout forming portion 12a, the cutout 13 is formed in the side wall portion 11b only in the first region $R_1$ of the hollow member 10, and the reinforcing part 20 is bonded to the side wall portion 11b so as to cover the cutout 13. Further, the second cutout forming portion 12 and the fourth cutout forming portion 12 that start from the front end 10a of the hollow member 10 are the second cutout forming portion 12b. Then, in the second cutout forming portion 12b, the cutout 13 is formed in the side wall portion 11d only in the second region $R_2$ of the hollow member 10, and the reinforcing part 20 is bonded to the side wall portion 11d so as to cover the cutout 13.

In the arrangement example illustrated in FIG. 7(a) and FIG. 7(b), when a high load is input to the front end 10a of the hollow member 10, the first cutout forming portion 12a closest to the front end 10a of the hollow member 10 (the first cutout forming portion 12a) enters a deformation mode where the first region $R_1$ becomes compressed and the second region $R_2$ becomes tensile because the cutout 13 is arranged only in the first region $R_1$. In the meantime, the second cutout forming portion 12 starting from the front end 10a of the hollow member 10 (the second cutout forming portion 12b) enters a deformation mode where the second region $R_2$ becomes compressed and the first region $R_1$ becomes tensile because the cutout 13 is arranged only in the second region $R_2$. Similarly, the third cutout forming portion 12 starting from the front end 10a of the hollow member 10 (the first cutout forming portion 12a) enters a deformation mode where the first region $R_1$ becomes compressed and the second region $R_2$ becomes tensile. Further, the fourth cutout forming portion 12 starting from the front end 10a of the hollow member 10 (the second cutout forming portion 12b) enters a deformation mode where the second region $R_2$ becomes compressed and the first region $R_1$ becomes tensile. Similarly to the example illustrated in FIG. 4 to FIG. 6, this causes the respective cutout forming portions 12 arranged in the hollow member 10 to be bent in zigzag (zigzag left and right) along the member longitudinal direction X. As a result, it is possible to stably enhance the energy absorption performance of the frame 1 as a whole.

In an arrangement example illustrated in FIG. 8(a) and FIG. 8(b), when the hollow member 10 is divided into two regions with the second axis $A_2$ as a boundary, one region (a region above the second axis $A_2$ in the example of FIG. 8(a) and FIG. 8(b)) is the first region $R_1$ and the other region (a region below the second axis $A_2$ in the example of FIG. 8(a) and FIG. 8(b)) is the second region $R_2$. Incidentally, even if the region above the second axis $A_2$ is referred to as the second region $R_2$ and the region below the second axis $A_2$ is referred to as the first region $R_1$, there is no difference.

In the arrangement example illustrated in FIG. 8(a) and FIG. 8(b), out of the four cutout forming portions 12 provided along the member longitudinal direction X of the hollow member 10, the first cutout forming portion 12 and the third cutout forming portion 12 that start from the front end 10a of the hollow member 10 are the first cutout forming portion 12a. Then, in the first cutout forming portion 12a, the cutouts 13 are each formed in the ridge line portions 11e, 11h that are located in the first region $R_1$ of the hollow member 10 and the reinforcing parts 20 are bonded so as to cover the cutouts 13. Further, the second cutout forming portion 12 and the fourth cutout forming portion 12 that start from the front end 10a of the hollow member 10 are the second cutout forming portion 12b. Then, in the second cutout forming portion 12b, the cutouts 13 are each formed in the ridge line portions 11f, 11g that are located in the second region $R_2$ of the hollow member 10 and the reinforcing parts 20 are bonded so as to cover the cutouts 13.

In the arrangement example illustrated in FIG. 8(a) and FIG. 8(b), when a high load is input to the front end 10a of the hollow member 10, the first cutout forming portion 12a closest to the front end 10a of the hollow member 10 (the first cutout forming portion 12a) enters a deformation mode where the first region $R_1$ becomes compressed and the second region $R_2$ becomes tensile because the cutouts 13 are arranged only in the first region $R_1$. In the meantime, the second cutout forming portion 12 starting from the front end 10a of the hollow member 10 (the second cutout forming portion 12b) enters a deformation mode where the second region $R_2$ becomes compressed and the first region $R_1$ becomes tensile because the cutouts 13 are arranged only in the second region $R_2$. Similarly, the third cutout forming portion 12 starting from the front end 10a of the hollow member 10 (the first cutout forming portion 12a) enters a deformation mode where the first region $R_1$ becomes compressed and the second region $R_2$ becomes tensile. Further, the fourth cutout forming portion 12 starting from the front end 10a of the hollow member 10 (the second cutout forming portion 12b) enters a deformation mode where the second region $R_2$ becomes compressed and the first region $R_1$ becomes tensile. Similarly to the example illustrated in FIG. 4 to FIG. 6, this causes the respective cutout forming portions 12 arranged in the hollow member 10 to be bent in zigzag (zigzag up and down) along the member longitudinal direction X. As a result, it is possible to stably enhance the energy absorption performance of the frame 1 as a whole.

In an arrangement example illustrated in FIG. 9(a) and FIG. 9(b), when the hollow member 10 is divided into two regions with the second axis $A_2$ as a boundary, one region (a region above the second axis $A_2$ in the example of FIG. 9(a) and FIG. 9(b)) is the first region $R_1$ and the other region (a region below the second axis $A_2$ in the example of FIG. 9(a) and FIG. 9(b)) is the second region $R_2$. Incidentally, even if the region above the second axis $A_2$ is referred to as the second region $R_2$ and the region below the second axis $A_2$ is referred to as the first region $R_1$, there is no difference.

In the arrangement example illustrated in FIG. 9(a) and FIG. 9(b), out of the four cutout forming portions 12 provided along the member longitudinal direction X of the hollow member 10, the first cutout forming portion 12 and the third cutout forming portion 12 that start from the front end 10a of the hollow member 10 are the first cutout forming portion 12a. Then, in the first cutout forming portion 12a, the cutout 13 is formed in the top wall portion 11a that is located in the first region $R_1$ of the hollow member 10 and the reinforcing part 20 is bonded to the top wall portion 11a so as to cover the cutout 13. Further, the second cutout forming portion 12 and the fourth cutout forming portion 12 that start from the front end 10a of the hollow member 10 are the second cutout forming portion 12b. Then, in the second cutout forming portion 12b, the cutout 13 is formed in the bottom wall portion 11c that is located in the second region $R_2$ of the hollow member 10 and the reinforcing part 20 is bonded to the bottom wall portion 11c so as to cover the cutout 13.

In the arrangement example illustrated in FIG. 9(a) and FIG. 9(b), when a high load is input to the front end 10a of the hollow member 10, the first cutout forming portion 12a closest to the front end 10a of the hollow member 10 (the first cutout forming portion 12a) enters a deformation mode where the first region $R_1$ becomes compressed and the second region $R_2$ becomes tensile because the cutout 13 is arranged only in the first region $R_1$. In the meantime, the second cutout forming portion 12 starting from the front end 10a of the hollow member 10 (the second cutout forming portion 12b) enters a deformation mode where the second region $R_2$ becomes compressed and the first region $R_1$ becomes tensile because the cutout 13 is arranged only in the second region $R_2$. Similarly, the third cutout forming portion 12 starting from the front end 10a of the hollow member 10 (the first cutout forming portion 12a) enters a deformation mode where the first region $R_1$ becomes compressed and the second region $R_2$ becomes tensile. Further, the fourth cutout forming portion 12 starting from the front end 10a of the hollow member 10 (the second cutout forming portion 12b) enters a deformation mode where the second region $R_2$ becomes compressed and the first region $R_1$ becomes tensile. Similarly to the example illustrated in FIG. 4 to FIG. 6, this causes the respective cutout forming portions 12 arranged in the hollow member 10 to be bent in zigzag (zigzag up and down) along the member longitudinal direction X. As a result, it is possible to stably enhance the energy absorption performance of the frame 1 as a whole.

Incidentally, the arrangement of the cutout 13 and the reinforcing part 20 in the first cutout forming portion 12a and the arrangement of the cutout 13 and the reinforcing part 20 in the second cutout forming portion 12b are preferably linearly symmetrical with the first axis $A_1$ or the second axis $A_2$ as the symmetry axis.

(Second Arrangement Example)

In the first arrangement example of the above-described cutouts and reinforcing parts, in the first cutout forming portion 12a, the cutout 13 and the reinforcing part 20 are arranged in the first region $R_1$, but in the second region $R_2$, the cutout 13 and the reinforcing part 20 are not arranged. On the other hand, in the second cutout forming portion 12b, the cutout 13 and the reinforcing part 20 are arranged in the second region $R_2$, but in the first region $R_1$, the cutout 13 and the reinforcing part 20 are not arranged. However, in the present invention, it is sufficient in the first cutout forming portion 12a as long as the cutout 13 and the reinforcing part 20 are arranged in the first region $R_1$, and thus it is not necessary that the cutout 13 and the reinforcing part 20 should not be arranged in the second region $R_2$. Further, it is sufficient in the second cutout forming portion 12b as long as the cutout 13 and the reinforcing part 20 are arranged in the second region $R_2$, and thus it is not necessary that the cutout 13 and the reinforcing part 20 should not be arranged in the first region $R_1$. That is, in the first cutout forming portion 12a, the cutout 13 and the reinforcing part 20 may be arranged also in the second region $R_2$. Further, in the second cutout forming portion 12b, the cutout 13 and the reinforcing part 20 may be arranged also in the first region $R_1$ similarly.

Figure 10:
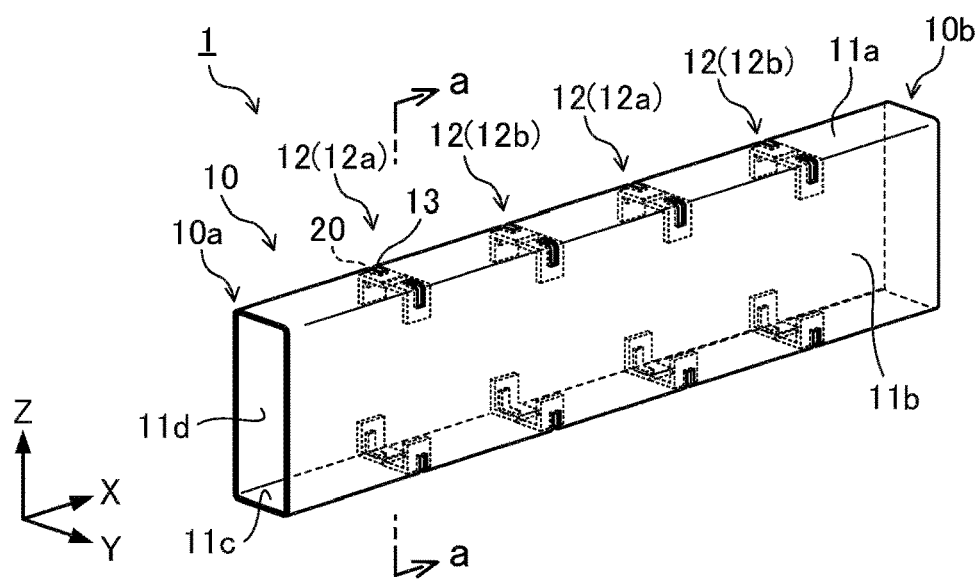
FIG. 10 is a perspective view illustrating a schematic configuration of a vehicle frame for explaining a second arrangement example of cutouts and reinforcing parts.

Thus, there will be explained a second arrangement example of the reinforcing parts 20. As illustrated in FIG. 10, also in this arrangement example, the first cutout forming portion 12a and the second cutout forming portion 12b are arranged alternately along the member longitudinal direction X of the hollow member 10. That is, out of the four cutout forming portions 12, the first cutout forming portion 12 and the third cutout forming portion 12 that start from the front end 10a of the hollow member 10 are the first cutout forming portion 12a. Further, the second cutout forming portion 12 and the fourth cutout forming portion 12 are the second cutout forming portion 12b.

Figure 11:
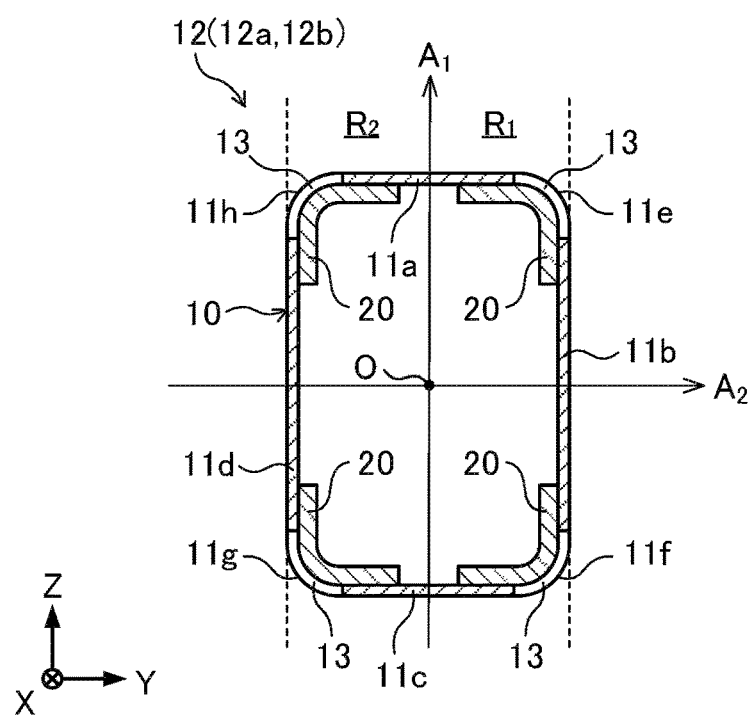
FIG. 11 is a cross-sectional view taken along a-a in FIG. 10.

In the second arrangement example, the arrangement of the cutout 13 and the reinforcing part 20 in the first cutout forming portion 12a and the arrangement of the cutout 13 and the reinforcing part 20 in the second cutout forming portion 12b are substantially the same. That is, as illustrated in FIG. 11, in both the first cutout forming portion 12a and the second cutout forming portion 12b, each cutout 13 is provided both in the ridge line portions 11e, 11f in the first region $R_1$ and in the ridge line portions 11g, 11h in the region $R_2$, and the reinforcing parts 20 are provided so as to cover the cutouts 13 respectively. In other words, in the first cutout forming portion 12a, the cutout 13 and the reinforcing part 20 are arranged in the first region $R_1$, and further also in the second region $R_2$, the cutout 13 and the reinforcing part 20 are arranged. Further, in the second cutout forming portion 12b, the cutout 13 and the reinforcing part 20 are arranged in the second region $R_2$, and further also in the first region $R_1$, the cutout 13 and the reinforcing part 20 are arranged. In the case of such a second arrangement example as well, when a load is input from the member longitudinal direction X of the hollow member 10, bending can be induced stably in each of the cutout forming portions 12 (the first cutout forming portion 12a and the second cutout forming portion 12b).

Figure 12:
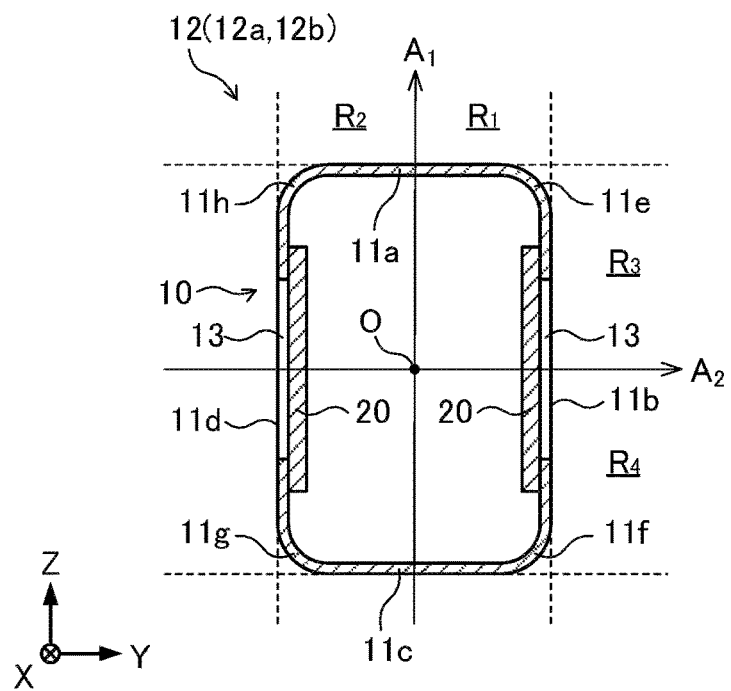
FIG. 12 is a view that illustrates an arrangement example of the reinforcing parts and corresponds to the cross section taken along a-a in FIG. 10.
Figure 13:
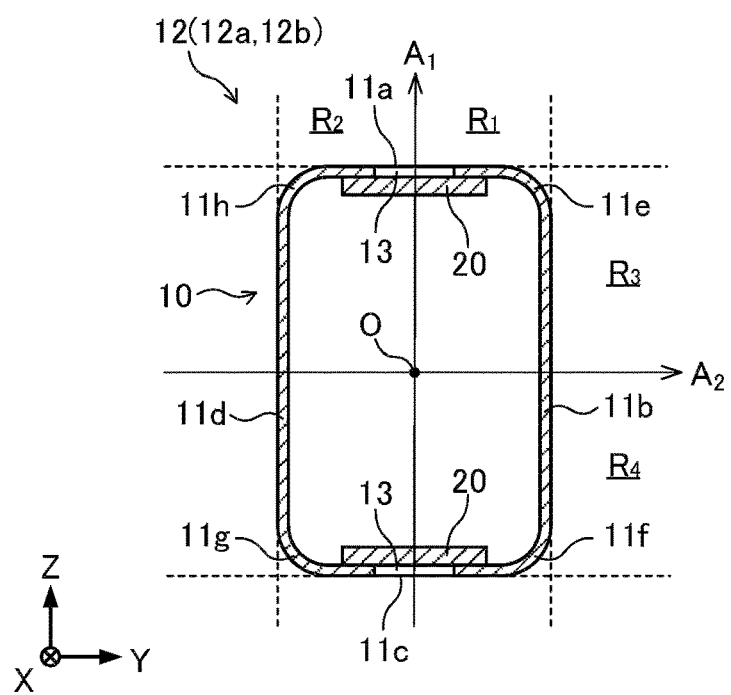
FIG. 13 is a view that illustrates an arrangement example of the reinforcing parts and corresponds to the cross section taken along a-a in FIG. 10.

Further, in the second arrangement example, in the first cutout forming portion 12a and the second cutout forming portion 12b, as illustrated in FIG. 12 and FIG. 13, for example, the cutouts 13 and the reinforcing parts 20 may be arranged. In the arrangement example illustrated in FIG. 12, in both the first cutout forming portion 12a and the second cutout forming portion 12b, the cutout 13 and the reinforcing part 20 are arranged in a pair of the side wall portions 11b and 11d of the hollow member 10. Further, in the arrangement example illustrated in FIG. 13, the cutout 13 and the reinforcing part 20 are arranged in the top wall portion 11a and the bottom wall portion 11c of the hollow member 10. In both the arrangement examples in FIG. 12 and FIG. 13 as well, the cutout 13 and the reinforcing part 20 are present in both the regions $R_1$ and $R_2$ of two regions divided with the first axis $A_1$ as a boundary and in both regions $R_3$ and $R_4$ of two regions divided with the second axis $A_2$ as a boundary. Also in the case where the cutout 13 and the reinforcing part 20 are arranged as above, it is possible to more stably induce bending of the hollow member 10 in each of the cutout forming portions 12.

The arrangement examples of the cutout 13 and the reinforcing part 20 of the hollow member 10 have been explained above. Incidentally, in the cutout forming portion 12 of the hollow member 10, the cutout 13 is provided, to thereby cause a decrease in stiffness of the hollow member 10, but the reinforcing part 20 is arranged at the position of the cutout 13, as in this embodiment, thereby making it possible to ensure the same stiffness as that of the case where the cutout 13 is not provided in the hollow member 10.

In order to more stably cause bending in each of the cutout forming portions 12, the strength of the reinforcing part 20 arranged in each of the cutout forming portions 12 preferably increases from one end to the other end of the hollow member 10. For example, in the case where the frame 1 is the front side member, the strength of the reinforcing part 20 preferably increases from the front end 10*a* to the rear end 10*b* of the hollow member 10, and in the case where the frame 1 is the rear side member, the strength of the reinforcing part 20 preferably increases from the rear end 10*b* to the front end 10*a* of the hollow member 10. This makes the reinforcing part 20 that is closer to the end portion on the load input side more likely to be broken, which makes the hollow member 10 more likely to be bent in each of the cutout forming portions 12 arranged along the member longitudinal direction X of the hollow member 10 in sequence. Incidentally, the strength of the reinforcing part 20 can be changed by using members with different plate thicknesses or Young's modulus, for example.

Further, the cutouts 13 formed in the hollow member 10, the arrangement of the reinforcing parts 20, and the number and arrangement of the cutout forming portions 12 are not limited in particular, and can be changed appropriately so as to enable the hollow member 10 to be bent in a desired bending direction according to the shape, configuration, or the like of the frame 1. In order to effectively improve the energy absorption performance, four or more cutout forming portions 12 are preferably provided. Further, the shape of the cutout is not limited to a quadrangle, but may also be a circular shape, an oval shape, or the like.

Further, the fiber direction of the FRP of the reinforcing part 20 is preferably oriented parallel to the member longitudinal direction X. This makes it possible to improve an initial reaction force at a time when a high load is input. Incidentally, when fiber directions are aligned in one direction industrially, the actual distribution of the fiber directions of the fiber is distributed within a range of −5° to 5° with respect to that one direction. Even in such an industrially distributed state, it is possible to assume that the mechanical properties are substantially the same as compared to the case where all the fiber directions are ideally aligned in one direction. Further, the distribution of the fiber directions in the reinforcing part can be observed with a micro-focus X-ray computed tomography (CT) system and identified by computer analyzing obtained three-dimensional images.

In the foregoing, the embodiment of the present invention has been explained in detail while referring to the attached drawings, but, the present invention is not limited to such an example. It is apparent that a person ordinary skilled in the art to which the present invention pertains is able to devise various variation or modification examples within the scope of the technical spirit described in the claims, and it should be understood that such examples belong to the technical scope of the present invention as a matter of course.

EXAMPLE

In order to evaluate the energy absorption performance of the frame according to the present invention, a collision simulation was performed. Analysis models each consist of the bumper beam and the frame as illustrated in FIG. 1 to FIG. 3 and a cross section of a hollow member is rectangular in shape. Further, the analysis models are created multiple under the conditions illustrated in Table 1 below. Incidentally, a weight reduction ratio in Table 1 is a ratio of a weight of each structure normalized by a weight of a structure 1. Further, a stiffness ratio in Table 1 is a ratio of a stiffness value of each structure normalized by a stiffness value of a structure 2.

TABLE 1

| | Hollow member | | | Reinforcing part | | | | | | |
|---|---|---|---|---|---|---|---|---|---|---|
| | Tensile strength [MPa] | Plate thickness [mm] | Arrangement of cutouts | Material | Plate thickness [mm] | Arrangement | Weight reduction ratio [%] | Absorbed energy ratio | Stiffness ratio | Note |
| Structure 1 | 780 | 2.0 | — | — | — | — | 0.0 | 1.00 | — | Comparative example |
| Structure 2 | 1180 | 1.4 | — | — | — | — | 30.0 | 0.92 | 1.00 | Comparative example |
| Structure 3 | 1180 | 1.4 | FIG. 4 | — | — | — | 30.2 | 0.91 | 0.95 | Comparative example |
| Structure 4 | 1180 | 1.4 | FIG. 4 | CFRP | 2.0 | FIG. 4 | 29.8 | 1.00 | 0.99 | Invention example |
| Structure 5 | 1180 | 1.4 | FIG. 10 | — | — | — | 30.5 | 0.67 | 0.89 | Comparative example |
| Structure 6 | 1180 | 1.4 | FIG. 10 | CFRP | 2.0 | FIG. 10 | 30.2 | 1.02 | 0.99 | Invention example |
| Structure 7 | 1180 | 1.4 | FIG. 4 | CFRP | 2.0, 2.4, 2.8, 3.2 | FIG. 4 | 29.4 | 1.01 | 1.00 | Invention example |
| Structure 8 | 1180 | 1.4 | FIG. 4 | GFRP | 5.0 | FIG. 4 | 28.2 | 1.00 | 0.99 | Invention example |
| Structure 9 | 1180 | 1.4 | — | CFRP | 2.0 | — | 29.8 | 0.84 | 1.00 | Comparative example |

In Table 1 above, a structure 1 and a structure 2 each are a structure in which the cutouts and the reinforcing parts 20 of the hollow member 10 are not provided, and the structure 2 is a thinner and high-tensile model as compared to the structure 1. A structure 3 is a structure including the hollow member 10 with the cutouts illustrated in FIG. 4 provided therein, but in the hollow member 10, the reinforcing parts 20 are not provided. A structure 4 is a structure illustrated in FIG. 4. In the structure 4, out of the four cutout forming portions 12, the first cutout forming portion 12 and the third cutout forming portion 12 that start from the front end 10*a* of the hollow member 10 are the first cutout forming portion 12*a* explained in FIG. 5, and the second cutout forming portion 12 and the fourth cutout forming portion 12 that start from the front end 10*a* of the hollow member 10 are the second cutout forming portion 12*b* explained in FIG. 6. A structure 5 is a structure including the hollow member 10 with the cutouts illustrated in FIG. 10 provided therein, but in the hollow member 10, the reinforcing parts 20 are not provided. A structure 6 is a structure illustrated in FIG. 10. In the structure 6, in all of the four cutout forming portions 12, the cutouts 13 and the reinforcing parts 20 are arranged in both the first region $R_1$ and the second region $R_2$, as explained in FIG. 11.

A structure 7 is a structure illustrated in FIG. 4. In the structure 7, out of the four cutout forming portions 12, the first cutout forming portion 12 and the third cutout forming portion 12 that start from the front end 10a of the hollow member 10 are the first cutout forming portion 12a explained in FIG. 5, and the second cutout forming portion 12 and the fourth cutout forming portion 12 that start from the front end 10a of the hollow member 10 are the second cutout forming portion 12b explained in FIG. 6. Further, in the structure 7, the tensile strength of the reinforcing part 20 arranged in each of the cutout forming portions 12 increases from the front end 10a to the rear end 10b of the hollow member 10. In the structure 7, the plate thickness of the reinforcing part 20 arranged in the first cutout forming portion 12 starting from the front end 10a of the hollow member 10 is 2.0 mm, the plate thickness of the reinforcing part 20 arranged in the second cutout forming portion 12 is 2.4 mm, the plate thickness of the reinforcing part 20 arranged in the third cutout forming portion 12 is 2.8 mm, and the plate thickness of the reinforcing part 20 arranged in the fourth cutout forming portion 12 is 3.2 mm.

A structure 8 is a structure illustrated in FIG. 4. In the structure 8, out of the four cutout forming portions 12, the first cutout forming portion 12 and the third cutout forming portion 12 that start from the front end 10a of the hollow member 10 are the first cutout forming portion 12a explained in FIG. 5, and the second cutout forming portion 12 and the fourth cutout forming portion 12 that start from the front end 10a of the hollow member 10 are the second cutout forming portion 12b explained in FIG. 6. However, in the structure 8, the reinforcing part 20 arranged in each of the cutout forming portions 12 is the GFRP.

In a structure 9, all the cutout forming portions 12 at four places are the first cutout forming portion 12a explained in FIG. 5. That is, in the structure 9, in all the first cutout forming portion 12, the second cutout forming portion 12, the third cutout forming portion 12, and the fourth cutout forming portion 12 that start from the front end 10a of the hollow member 10, the cutout 13 and the reinforcing part 20 are arranged only in the first region $R_1$, and in the second region $R_2$, the cutout 13 and the reinforcing part 20 are not provided.

In the structure 4 and the structure 6, the mechanical properties of the CFRP used as the reinforcing part 20 are as follows.

Vf (fiber-content volume ratio): 50%
Young's modulus: 102 GPa
Fracture strength: 1500 MPa
Fracture elongation: 1.5%

In the structure 8, the mechanical properties of the GFRP used as the reinforcing part 20 are as follows.

Vf (fiber-content volume ratio): 50%
Young's modulus: 13 GPa
Fracture strength: 200 MPa
Fracture elongation: 3%

In the structures 3 to 9, the size of each cutout is 5 mm in width×40 mm in length. Further, in the structures 4 and 6 to 9, the size of each reinforcing part is 25 mm in width×70 mm in length. The stiffness value of each of the structures was found from the reaction force obtained when a 1-mm lateral displacement was applied to the tip of the front side member.

This simulation, which means a simulation of a frontal crash test of an automobile, was performed by making a rigid wall with a mass of 200 kg collide with the bumper beam 50 illustrated in FIG. 1 to FIG. 3 at 12 m/s. Incidentally, the rear end 10b of the hollow member 10 in each of the analysis models is held.

Figure 14:
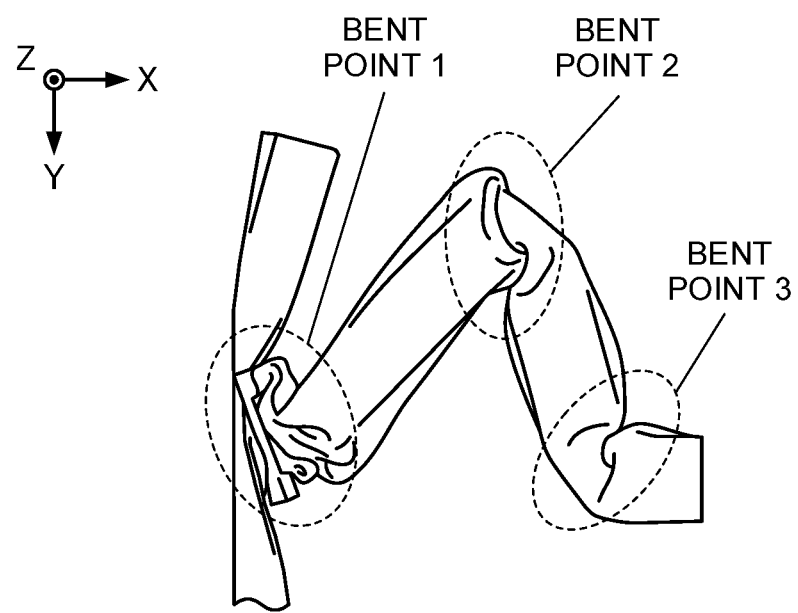
FIG. 14 is a plan view illustrating a deformed state of a vehicle frame in a comparative example (a structure 1).
Figure 15:
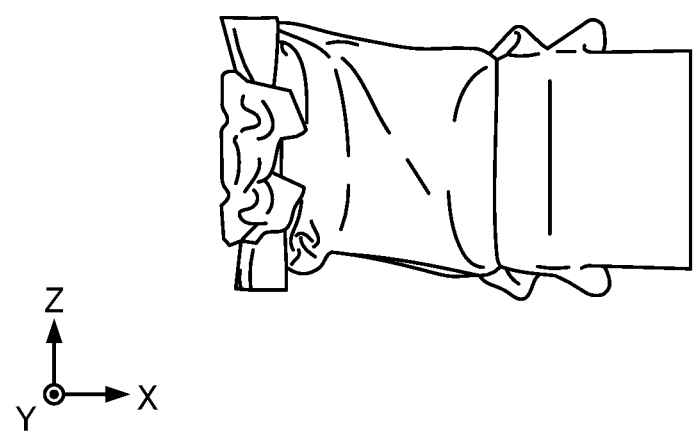
FIG. 15 is a side view illustrating the deformed state of the vehicle frame in the comparative example (the structure 1).

FIG. 14 is a plan view illustrating a deformed state of the analysis model having the structure 1 in the collision simulation, and FIG. 15 is a side view of the deformed state. As illustrated in FIG. 14, in the structure 1, three bent points of the hollow member were made at the time of deformation. Such bending of the hollow member occurred also in the structure 2.

Figure 16:
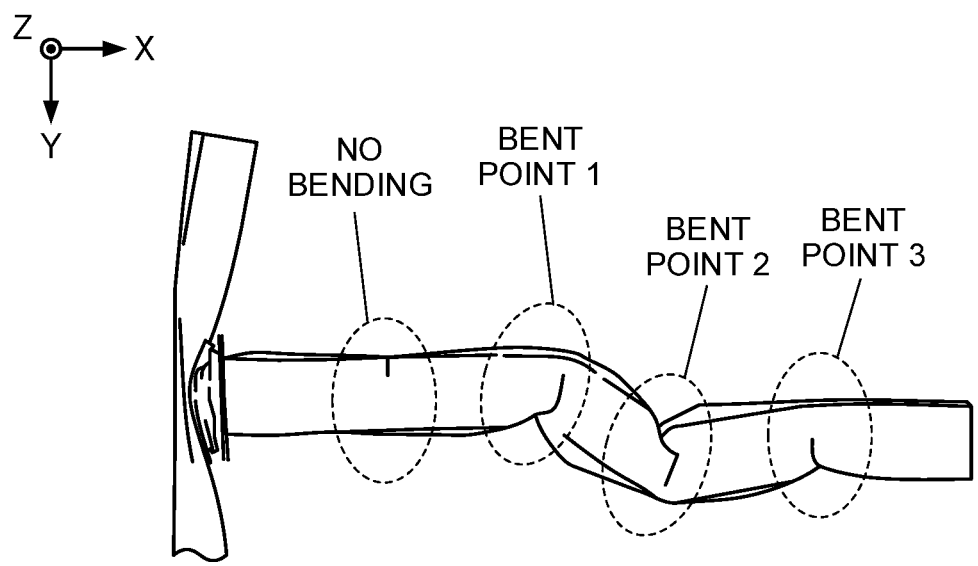
FIG. 16 is a plan view illustrating a deformed state of a vehicle frame in a comparative example (a structure 3).
Figure 17:
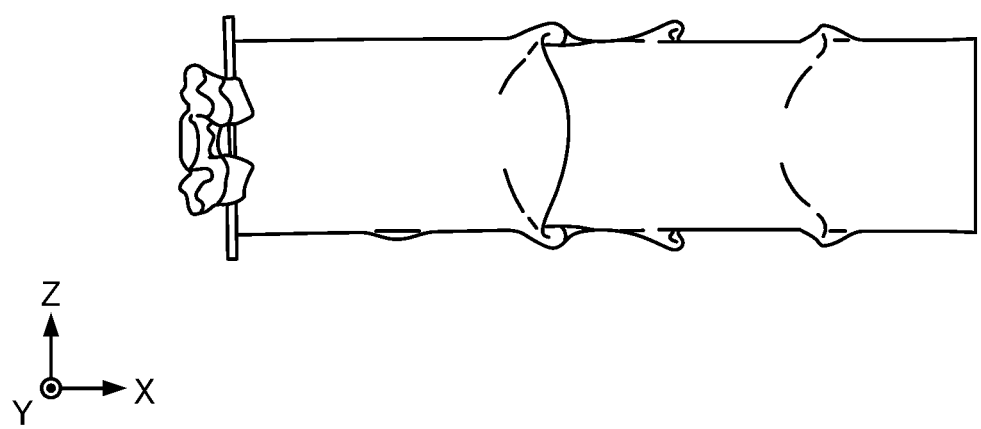
FIG. 17 is a side view illustrating the deformed state of the vehicle frame in the comparative example (the structure 3).

FIG. 16 is a plan view illustrating a deformed state of the analysis model having the structure 3 in the collision simulation, and FIG. 17 is a side view of the deformed state. As illustrated in FIG. 16, in the structure 3, the cutouts were provided in the hollow member, but no bending occurred in the cutout located closest to the front end of the hollow member, and bending first occurred in the rear cutout. The bent point was made at three places and these three places were remained unchanged.

Figure 18:
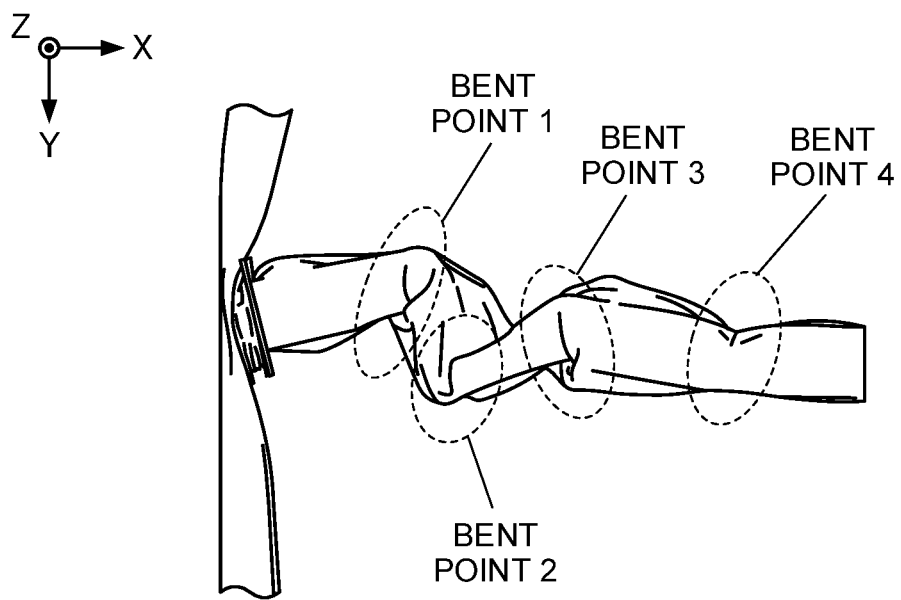
FIG. 18 is a plan view illustrating a deformed state of a vehicle frame in an invention example (a structure 4).
Figure 19:
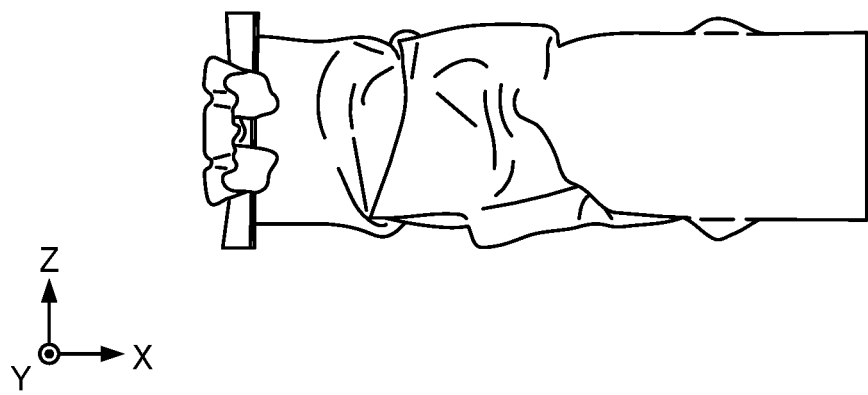
FIG. 19 is a side view illustrating the deformed state of the vehicle frame in the invention example (the structure 4).

In the meantime, FIG. 18 is a plan view illustrating a deformed state of the analysis model having the structure 4 in the collision simulation, and FIG. 19 is a side view of the deformed state. As illustrated in FIG. 18, in the structure 4, four bent points were made, and thus it was possible to increase the number of bent points as compared to the structure 1. In the structure 4 with the reinforcing part 20 provided at the position of the cutout in particular, the position of the cutout is the bent point, which is, as a result, different from the structure 3 with only the cutouts provided therein. Further, the hollow member is bent in zigzag along the member longitudinal direction, thereby making it possible to stably enhance the energy absorption performance of the frame as a whole.

Figure 20:
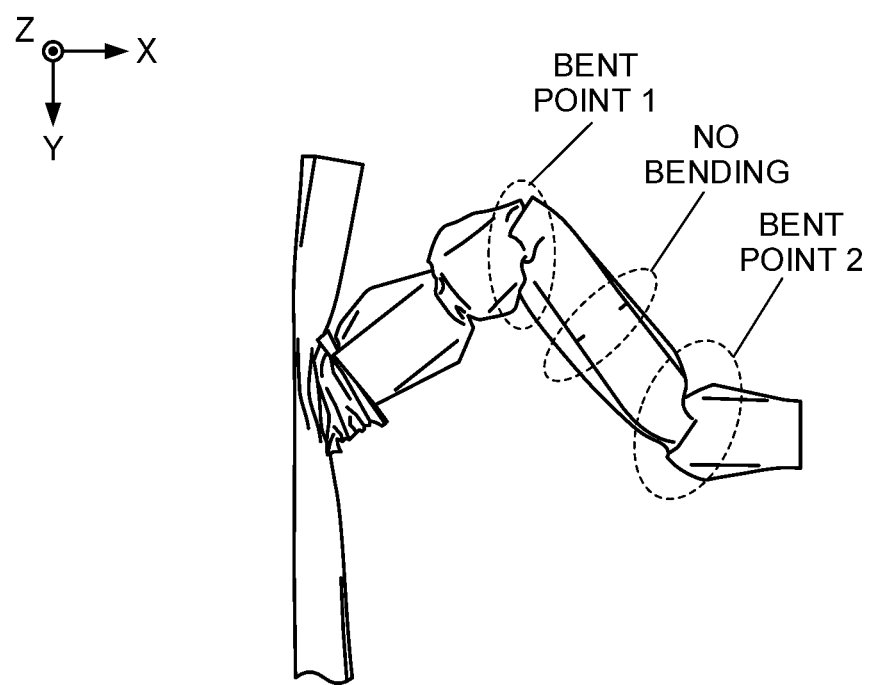
FIG. 20 is a plan view illustrating a deformed state of a vehicle frame in a comparative example (a structure 5).
Figure 21:
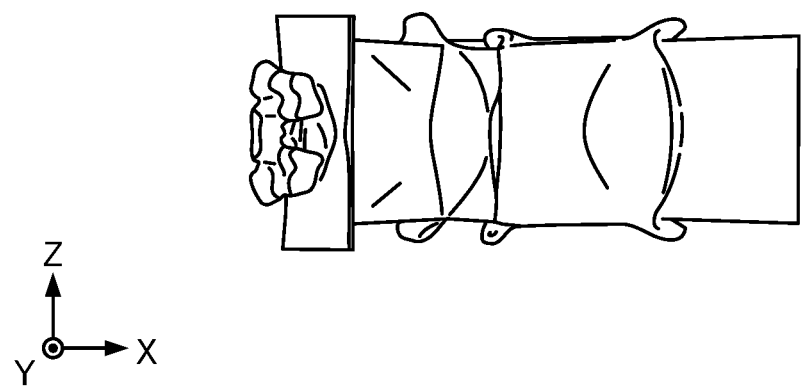
FIG. 21 is a side view illustrating the deformed state of the vehicle frame in the comparative example (the structure 5).

FIG. 20 is a plan view illustrating a deformed state of the analysis model having the structure 5 in the collision simulation, and FIG. 21 is a side view of the deformed state. As illustrated in FIG. 20, in the structure 5, the cutouts were provided in the hollow member, but no bending occurred in the cutout located closest to the front end of the hollow member and bending first occurred in the rear cutout, resulting in that the bent point was made at two places.

Figure 22:
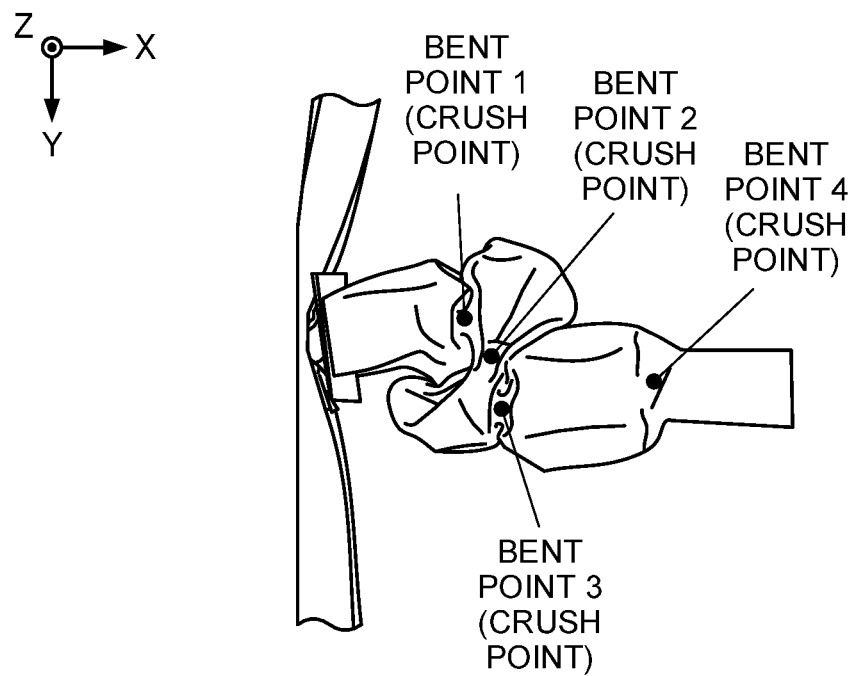
FIG. 22 is a plan view illustrating a deformed state of a vehicle frame in an invention example (a structure 6).
Figure 23:
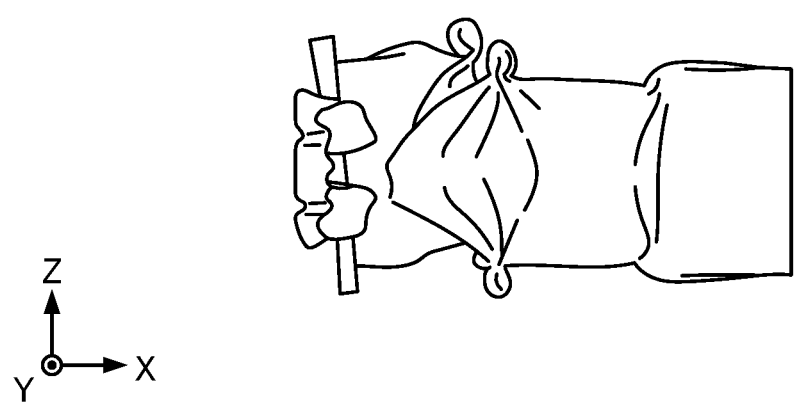
FIG. 23 is a side view illustrating the deformed state of the vehicle frame in the invention example (the structure 6).

In the meantime, FIG. 22 is a plan view illustrating a deformed state of the analysis model having the structure 6 in the collision simulation, and FIG. 23 is a side view of the deformed state. As illustrated in FIG. 22, in the structure 6 with the reinforcing part 20 provided at the position of the cutout, the hollow member was crushed at the position of the cutout and four crush points were made. A plastic deformation region of the crush point is as large as or larger than that of the bent point, and the crush point contributes to the energy absorption and thus can be regarded as equivalent to the bent point. Therefore, it is possible to increase the number of bent points as compared to the structure 5. In the structure 6, since the crush deformation at the bent point occurred continuously, the deformation similar to what is called the axial crush deformation occurred in the entire member.

Figure 24:
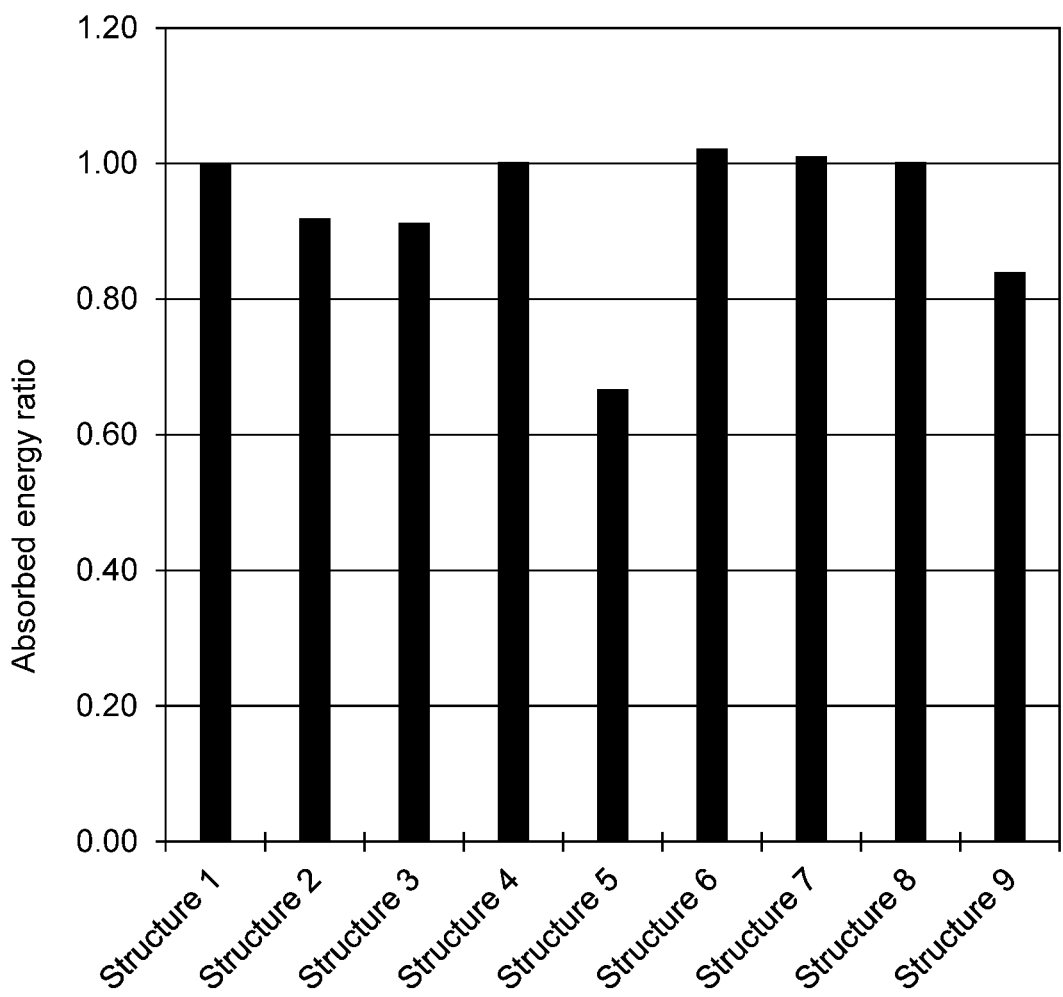
FIG. 24 is a chart where a comparison in energy absorption performance is made among respective analysis models in a collision simulation.

Then, from a load-stroke diagram obtained when a rigid wall was made to collide with each of the analysis models, an energy absorption amount at 800 mm stroke of the rigid wall was calculated and a comparison in energy absorption performance was made among the respective analysis models. Results of the comparison are illustrated in FIG. 24. Incidentally, the vertical axis of the graph in FIG. 24 is a ratio of the energy absorption amount in each structure to the energy absorption amount in the structure 1.

As illustrated in FIG. 24, in the structure 4 and the structures 6 to 8, the energy absorption performance is maintained or improves as compared to the structure 1. As illustrated in Table 1 above, since the structure 4 and the structures 6 to 8 also have a large weight reduction ratio as compared to the structure 1, it is possible to maintain or improve the energy absorption performance while reducing the weight in the structural member for vehicle according to the present invention. Further, as illustrated in Table 1 above, in the structure 4 and the structures 6 to 8, the stiffness ratio improves as compared to the structure 3 and the structure 5 each having no reinforcing parts provided therein, and the stiffness equivalent to that of the structure 2 having no cutouts provided therein is ensured.

The structure 9, in which the cutout 13 and the reinforcing part 20 are arranged only in the first region $R_1$ and the cutout 13 and the reinforcing part 20 are not provided in the second region $R_2$ in all of the four cutout forming portions 12, has inferior energy absorption performance.

EXPLANATION OF CODES 1 frame
10 hollow member
10a front end of hollow member
10b rear end of hollow member
11a top wall portion of hollow member
11b, 11d side wall portion of hollow member
11c bottom wall portion of hollow member
11e to 11h ridge line portion of hollow member
12 cutout forming portion
12a first cutout forming portion
12b second cutout forming portion
13 cutout
20 reinforcing part
30 crash box
50 bumper beam
$A_1$ first axis of cross section of hollow member
$A_2$ second axis of cross section of hollow member
O barycenter of cross section of hollow member
$R_1$ first region
$R_2$ second region
$R_3$ third region
$R_4$ fourth region

What is claimed is:

1. A structural member for vehicle, comprising:
   a hollow member made of metal, the hollow member including cutout forming portions arranged along a member longitudinal direction of the hollow member, the cutout forming portions each having a cutout; and
   reinforcing parts made of fiber reinforced plastic (FRP), the reinforcing parts bonded to the hollow member, the reinforcing parts covering each of the cutouts in each of the cutout forming portions, wherein
   when on a coordinate axis with a barycenter of a cross section vertical to the member longitudinal direction of the hollow member set as an origin, a principal axis where a second moment of area is minimum is referred to as a first axis, an axis vertical to the first axis is referred to as a second axis, one region out of two regions of the hollow member, the two regions obtained by dividing the hollow member with the first axis or the second axis as a boundary, is referred to as a first region, and the other region is referred to as a second region, a first cutout forming portion having the cutout in the first region and a second cutout forming portion having the cutout in the second region are arranged alternately along the member longitudinal direction of the hollow member.

2. The structural member for vehicle according to claim 1, wherein
   the first cutout forming portion that has the cutout in the first region does not have the cutout in the second region, and
   the second cutout forming portion that has the cutout in the second region does not have the cutout in the first region.

3. The structural member for vehicle according to claim 1, wherein
   the first cutout forming portion that has the cutout in the first region has the cutout in the second region, and
   the second cutout forming portion that has the cutout in the second region has the cutout in the first region.

4. The structural member for vehicle according to claim 1, wherein
   a strength of the reinforcing part arranged in each of the cutout forming portions increases from one end to the other end in the member longitudinal direction of the hollow member.

5. The structural member for vehicle according to claim 1, wherein
   a fiber direction of the reinforcing part is oriented parallel to the member longitudinal direction of the hollow member.

6. The structural member for vehicle according to claim 4, wherein
   a fiber direction of the reinforcing part is oriented parallel to the member longitudinal direction of the hollow member.

7. The structural member for vehicle according to claim 1, wherein
   the fiber reinforced plastic (FRP) is carbon fiber reinforced plastic (CFRP) or glass fiber reinforced plastic (GFRP).

8. The structural member for vehicle according to claim 4, wherein
   the fiber reinforced plastic (FRP) is carbon fiber reinforced plastic (CFRP) or glass fiber reinforced plastic (GFRP).

9. The structural member for vehicle according to claim 5, wherein
   the fiber reinforced plastic (FRP) is carbon fiber reinforced plastic (CFRP) or class fiber reinforced elastic (GFRP).

10. The structural member for vehicle according to claim 6, wherein
    the fiber reinforced plastic (FRP) is carbon fiber reinforced plastic (CFRP) or glass fiber reinforced plastic (GFRP).

11. The structural member for vehicle according to claim 1, wherein
    a tensile strength of the hollow member is 980 MPa or more.

12. The structural member for vehicle according to claim 4, wherein
    a tensile strength of the hollow member is 980 MPa or more.

13. The structural member for vehicle according to claim 5, wherein
  a tensile strength of the hollow member is 980 MPa or more.

14. The structural member for vehicle according to claim 6, wherein
  a tensile strength of the hollow member is 980 MPa or more.

15. The structural member for vehicle according to claim 7, wherein
  a tensile strength of the hollow member is 980 MPa or more.

16. The structural member for vehicle according to claim 8, wherein
  a tensile strength of the hollow member is 980 MPa or more.

17. The structural member for vehicle according to claim 9, wherein
  a tensile strength of the hollow member is 980 MPa or more.

18. The structural member for vehicle according to claim 10, wherein
  a tensile strength of the hollow member is 980 MPa or more.

* * * * *